(12) United States Patent
Harada

(10) Patent No.: US 8,533,494 B2
(45) Date of Patent: Sep. 10, 2013

(54) STORAGE SYSTEM TO WHICH REMOVABLE ENCRYPTION/DECRYPTION MODULE IS CONNECTED

(75) Inventor: Akitatsu Harada, Tama (JP)

(73) Assignee: Hitachi, Ltd., Tokyo (JP)

( * ) Notice: Subject to any disclaimer, the term of this patent is extended or adjusted under 35 U.S.C. 154(b) by 1242 days.

(21) Appl. No.: 11/969,394

(22) Filed: Jan. 4, 2008

(65) Prior Publication Data

US 2010/0031056 A1 Feb. 4, 2010

(30) Foreign Application Priority Data

Jul. 27, 2007 (JP) ................................. 2007-195463

(51) Int. Cl.
*G06F 11/30* (2006.01)

(52) U.S. Cl.
USPC .......................................... 713/193; 713/185

(58) Field of Classification Search
USPC .................................................. 713/193, 185
See application file for complete search history.

(56) References Cited

U.S. PATENT DOCUMENTS

| 7,356,707 | B2 * | 4/2008 | Foster et al. ................... 713/189 |
| 2006/0182281 | A1 | 8/2006 | Taguchi et al. |
| 2006/0280297 | A1 * | 12/2006 | Fukaya ............................ 380/28 |
| 2007/0180239 | A1 | 8/2007 | Fujibayashi et al. |
| 2009/0046858 | A1 * | 2/2009 | Iyer et al. ........................ 380/259 |

FOREIGN PATENT DOCUMENTS

| JP | 2006-227839 A | 8/2006 |
| JP | 2007-028502 A | 2/2007 |

* cited by examiner

*Primary Examiner* — Harunur Rashid
(74) *Attorney, Agent, or Firm* — Sughrue Mion, PLLC

(57) ABSTRACT

A storage system comprises a connector to which a removable module is connected. The removable module comprises a storage section for storing encryption/decryption information related to encryption and decryption of data, and/or an encryption/decryption engine for encrypting/decryption data by a predetermined encryption/decryption scheme. A control section and/or a module of the storage system encrypts data using the encryption/decryption information, or decrypts encrypted data using the encryption/decryption information. Alternatively the encryption/decryption engine encrypts data or decrypts encrypted data.

10 Claims, 16 Drawing Sheets

FIG. 3

KEY MAPPING TABLE 461

| MODULE ID | ENCRYPTION/ DECRYPTION SCHEME NAME | KEY NAME | ALL STORAGE | ENCRYPTION TARGET | | |
|---|---|---|---|---|---|---|
| | | | | PORT ID | HOST GROUP ID | LUN |
| MODULE A | SCHEME A | ENCRYPTION KEY YYY | NO | PORT#1 | — | LU#1 |
| MODULE A | SCHEME A | ENCRYPTION KEY XXX | NO | PORT#2 | HG#001 | — |
| .. | .. | .. | .. | .. | .. | .. |

LU-STORAGE MAPPING TABLE 3122

| LUN | STORAGE ID | ADDRESS | MODULE ID |
|---|---|---|---|
| LU #1 | 001 002 003 004 | 0001-0010 | MODULE A |
| LU#2 | 001 002 003 004 | 0010-0020 | NONE |
| : | : | : | : |

Column labels: 31221, 31222, 31223, 31224

FIG. 5

PORT-LU MAPPING TABLE 3121

| PORT ID | HOST GROUP ID | LUN | ENCRYPTION MODULE |
|---|---|---|---|
| PORT#1 | HG#002 | LU#1 | MODULE A |
| PORT#1 | HG#003 | LU#2 | NONE |
| PORT#2 | HG#001 | LU#3 | MODULE B |
| : | : | : | : |

Column labels: 31211, 31212, 31213, 31214

FIG. 6

PORT DECRYPTION TABLE 3123

| PORT ID | DECRYPTION YES/NO |
|---------|-------------------|
| PORT#1  | YES               |
| PORT#2  | NO                |
| PORT#3  | YES               |
| ⋮       | ⋮                 |

31231, 31232

STORAGE SYSTEM TO WHICH REMOVABLE ENCRYPTION/DECRYPTION MODULE IS CONNECTED

CROSS-REFERENCE TO PRIOR APPLICATION

This application relates to and claims the benefit of priority from Japanese Patent Application No. 2007-195463, filed on Jul. 27, 2007 the entire disclosure of which is incorporated herein by reference.

BACKGROUND OF THE INVENTION

1. Field of the Invention

The present invention generally relates to the encryption of data to be stored in a storage system.

2. Description of the Related Art

A storage system having an encryption function is known. This type of storage system has been disclosed in Japanese Patent Application Laid-Open No. 2007-028502, and No. 2006-227839, for example. According to the technology disclosed in these documents, data which the storage system received from the host is encrypted by the encryption function of the storage system, and the encrypted data is stored in the storage device.

However, there is a case when data migrates from a first storage system to a second storage system. Data migration is executed when an old storage system is replaced with a new storage system, for example.

In this case, the migration target data may be data encrypted by a first encryption function of the first storage system. If so, migration must be performed by the following scheme in order to decrypt the encrypted data to be stored in the second storage system using a second encryption function of the second storage system. That is, the first storage system decrypts the encrypted data using the first encryption function, sends this decrypted data to the second storage system, then the second storage system encrypts the decrypted data again using the second encryption function, and stores this encrypted data. This means that data which is not encrypted (hereafter called unencrypted data) is released outside the storage system during the migration of the data. Also time required for the migration of the data increases since decryption and re-encryption are required for all the encrypted data to be the migration target. A method for solving these problems is the first storage system sending the encrypted data itself to the second storage system, but in this case, the encrypted data to be stored in the second storage system, which is not data encrypted by the second encryption function, cannot be decrypted by the second storage system.

Also a change of the encryption scheme used for the data to be stored may be desired. One method to meet this demand is to perform the above mentioned migration of data. By this, an encryption scheme used for the data to be stored can be changed from the first encryption scheme using the first encryption function of the first storage system, to the second encryption scheme using the second encryption function of the second storage system. With this method, however, unencrypted data is released outside the storage system when the encryption scheme is changed.

SUMMARY OF THE INVENTION

With the foregoing in view, it is a first object of the present invention to allow a second storage system to decrypt the data encrypted by a first storage system after the encrypted data migrates to the second storage system.

It is a second object of the present invention to change an encryption scheme of data without releasing unencrypted data outside the storage system.

Other objects of the present invention will be clarified by the description herein below.

The storage system has a connector to which a removable module is connected. The removable module has a storage section for storing an encryption/decryption information related to the encryption and decryption of data, and/or an encryption/decryption engine for encrypting/decryption data by a predetermined encryption/decryption scheme. At least one of a control section of the storage system and the encryption/decryption module encrypts data using the encryption/decryption information or decrypts encrypted data using the encryption/decryption information. Or the encryption/decryption engine encrypts data or decrypts encrypted data.

In the case of the migration of data, a module which is connected to a first storage system and is being used for encryption and decryption is disconnected from the first storage system, and is connected to the second storage system, and data encrypted using this module (encrypted data) migrates from the first storage system to a second storage system without being decrypted. The encrypted data which migrated to the second storage system can be decrypted by a module connected to the second storage system.

In the case of changing an encryption/decryption scheme, data in the storage system is decrypted by the first encryption/decryption scheme using a module which is connected to the storage system and being used for encryption and decryption, and the decrypted data is encrypted by a second encryption/decryption scheme using another module connected to the storage system.

BRIEF DESCRIPTION OF THE DRAWINGS

FIG. 3 shows a configuration example of the key mapping table;

FIG. 4 shows a configuration example of the LU-storage mapping table;

FIG. 5 shows a configuration example of the port-LU mapping table;

FIG. 6 shows a configuration example of the decryption control table;

DESCRIPTION OF THE PREFERRED EMBODIMENTS

Figure 1:
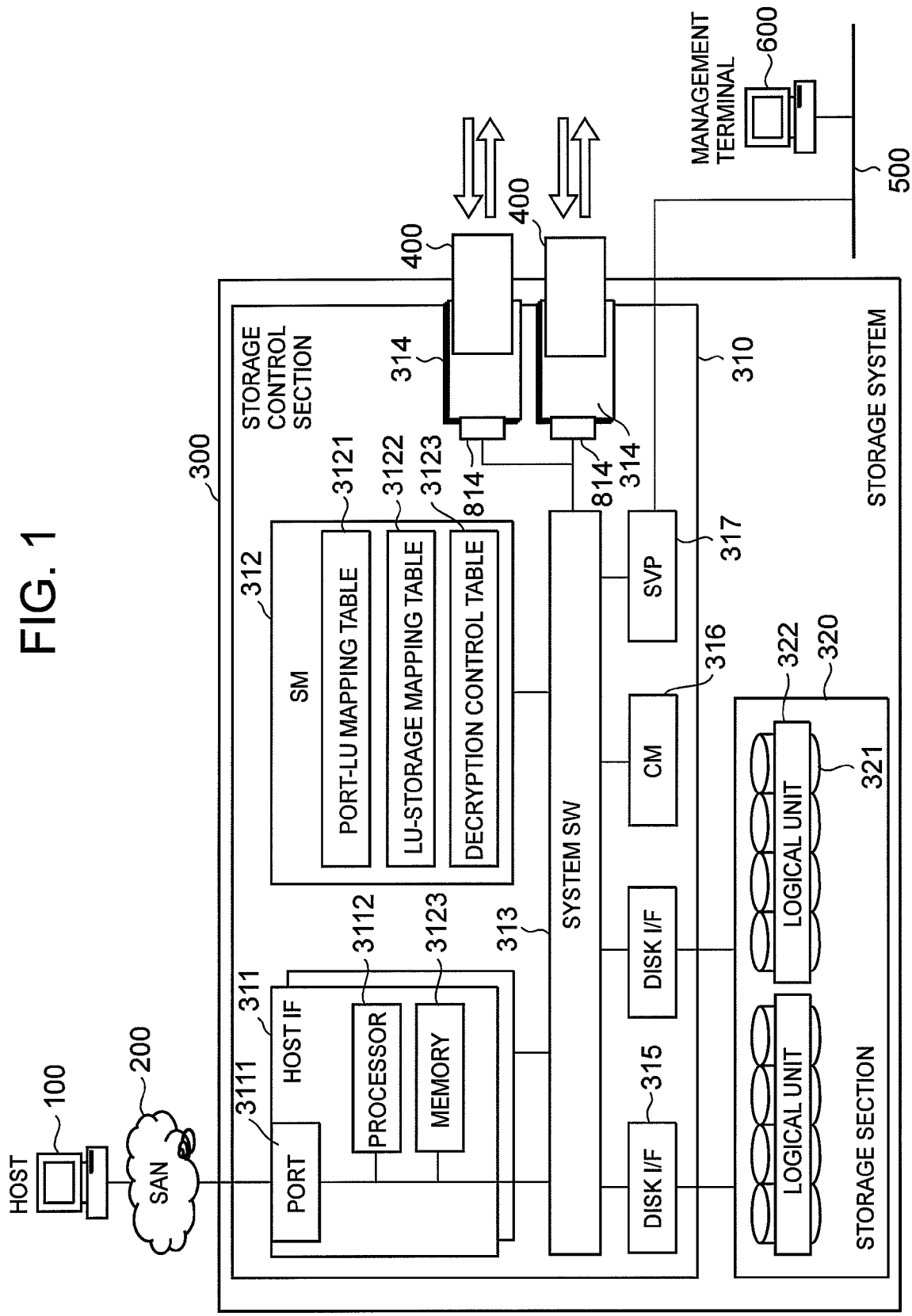
FIG. 1 is a diagram depicting a computer system according to an embodiment of the present invention.

According to an embodiment, a storage system comprises a storage device, a connector to which a removable encryption/decryption module is connected, and a control section which controls writing of data to a storage device and reading of data from the storage device, and has the above mentioned connector. The encryption/decryption module has a storage section for storing encryption/decryption information related to the encryption and decryption of data, and/or an encryption/decryption engine for encrypting/decryption data by a predetermined encryption/decryption scheme. At least one of the control section and the encryption/decryption module encrypts data using the encryption/decryption information or decrypts the encrypted data using the encryption/decryption information. Or the encryption/decryption engine encrypts data or decrypts the encrypted data.

The encryption/decryption module may be comprised of a module dedicated to encryption and a module dedicated to decryption. In this case, the module dedicated to encryption encrypts data, and/or stores information on encryption, and the module dedicated to decryption decrypts encrypted data, and/or stores information related to decryption.

According to an embodiment, a plurality of connectors exist, and the plurality of connectors include a first connector and a second connector. A first encryption/decryption module is connected to the first connector, and a second encryption/decryption module is connected to the second connector. The storage device stores encrypted data by a first encryption/decryption scheme. The control section reads encrypted data from the storage device, and at least one of the control section and the first encryption/decryption module decrypts the encrypted data that has been read, using the first encryption/decryption scheme information, or a first encryption/decryption engine in the first encryption/decryption module decrypts the encrypted data by a first encryption/decryption scheme. At least one of the control section and the second encryption/decryption module encrypts the decrypted data using second encryption/decryption scheme information, or a second encryption/decryption engine in the second encryption/decryption module encrypts the decrypted data by a second encryption/decryption scheme, and the control section writes the encrypted data to the storage device or another storage device.

According to an embodiment, the first encryption/decryption information of the first encryption/decryption module includes first key information. The second encryption/decryption information of the second encryption/decryption module includes second key information. The encoded data stored in the storage device is data encrypted using the first key information by the first encryption/decryption scheme. At least one of the control section and the first encryption/decryption module decrypts the encrypted data that has been read using the first key information by the first encryption/decryption scheme. At least one of the control section and the second encryption/decryption module encodes the decrypted data using the second key information by the second encryption/decryption scheme.

According to an embodiment, a plurality of storage devices exist. The first encryption/decryption information further includes key management information. The key management information shows the correspondence of a first key ID, which is information for identifying first key information, and encryption target element information for indicating a storage device or an element with which a storage device is associated. At least one of the control section, the first encryption/decryption module and the second encryption/decryption module copies the first key management information from the storage section of the first encryption/decryption module to the storage section of the second encryption/decryption module. At least one of the control section and the second encryption/decryption module updates the first key ID in the copied key management information to the second key ID, which is information for identifying the second key information.

According to an embodiment, at least one of the control section, the first encryption/decryption module and the second encryption/decryption module judges the compatibility between the first encryption/decryption scheme and the second encryption/decryption scheme, and if it is judged as compatible, at least one of the control section and the first encryption/decryption module performs decryption by the first encryption/decryption scheme, but does not perform the decryption if it is judged as incompatible.

According to an embodiment, compatibility refers to whether the data size of encrypted data is different between a case of encrypting data with a predetermined data size by the first encryption/decryption scheme, and a case of encrypting the data by the second encryption/decryption scheme.

According to an embodiment, the control section judges whether the second encryption/decryption scheme, which is an encryption/decryption scheme after change, is an older scheme than the first encryption/decryption scheme, which is an encryption/decryption scheme before change of the encryption/decryption scheme, and sends a warning if it is judged as an older scheme.

According to an embodiment, a plurality of connectors exist, and the plurality of connectors include a first connector and a second connector. A first encryption/decryption module is connected to the first connector. A second encryption/decryption module is connected to the second connector. The storage device stores encrypted data, which is data encrypted using the encryption/decryption information. At least one of the control section, the first encryption/decryption module and the second encryption/decryption module copies all or a part of the encryption/decryption information from the first encryption/decryption module to the second encryption/decryption module. The control section reads the encrypted data from the storage device, and sends the encrypted data to a migration destination storage system without decryption the data.

According to an embodiment, a plurality of storage devices exist. The encryption/decryption information includes key information and key management information. The key management information shows the correspondence of a key ID, which is information for identifying the key information, and encryption target element information for indicating a storage device or an element with which a storage device is associated. The part of the encryption/decryption information to be copied refers to the key management information.

According to an embodiment, the encryption/decryption module further has an authentication information storage section for storing authentication information. At least one of the control section and the encryption/decryption module judges whether the use of the encryption/decryption module is permitted using the authentication information. The first encryption/decryption module is a module for which use in the storage system is judged to be permitted in the judgment of usage permission. The second encryption/decryption module is a module for which use in the storage system is judged to be temporarily permitted for copying the encryption/decryption information in the judgment of usage permission.

According to an embodiment, access to the storage device is prohibited when the control section detects that the encryption/decryption module is disconnected from the connector.

According to an embodiment, the connection is constructed so that a removable storage device can also be connected thereto.

According to an embodiment, a plurality of connectors and a plurality of storage devices exist. The storage system further has a management storage section for storing encryption/decryption management information. The encryption/decryption management information shows the correspondence of a module ID, which is information for identifying an encryption/decryption module, and encryption target element information for indicating a storage device or an element with which a storage device is associated. The control section specifies a module ID corresponding to an encryption target information element related to an access destination storage device based on the encryption/decryption management information, and an encryption/decryption module identified by the specified module ID encodes data to be written to the access destination storage device, or decrypts encrypted data read from the access destination storage device.

Two or more embodiments, out of the above mentioned plurality of embodiments, can be combined. Each of the above mentioned sections can be constructed by hardware, computer program, or a combination thereof (e.g. implementing a part by a computer program and implementing the rest by hardware). The computer program is read by a predetermined processor, and is executed. During information processing where the computer program is read by the processor and executed, a storage area on hardware resources, such as a memory, may be used. The computer program may be installed in the computer from such a recording medium as a CD-ROM, or may be downloaded to the computer via a communication network.

An embodiment of the present invention will now be described in detail with reference to the drawings. In the embodiment, it is assumed that the removable encryption/decryption module is not separated into a module dedicated to encryption and a module dedicated to decryption, but one module is used for both encryption and decryption. It is also assumed that an encryption/decryption engine for executing encryption and decryption by a predetermined encryption/decryption scheme has been installed in the encryption/decryption module.

FIG. 1 shows a configuration of a computer system according to an embodiment of the present invention.

One or a plurality of host computers 100 and a storage system 300 are connected to a first communication network, such as a SAN 200.

The host computer 100 is a computer device having such information processing resources as a CPU (Central Processing Unit) and a memory, for example, and is constructed as a personal computer, a workstation or a main frame, for example.

The storage system 300 can be a RAID system having many physical storage devices 321 arranged in an array, for example. The storage system 300 comprises a storage control section 310 and a storage section 320.

The storage control section 310 further comprises a plurality of (or one) host I/F 311, a plurality of (or one) storage I/F 315, a cache memory ("CM" in FIG. 1) 316, a shared memory ("SM" in FIG. 1) 312, a system switch ("system SW" in FIG. 1) 313, and a service processor (hereafter "SVP") 317. The storage control section 310 has one or more slot sections, such as the two slot sections 314 and 314. Hereafter these two slot sections 314 and 314 are simply referred to as "slot section 314" if these slot sections need not be distinguished, and referred to as the "first slot section 314" and the "second slot section 314" if they need be distinguished.

The slot section 314 forms a slot, and a device, where information and an engine on encryption and decryption are modulated (hereafter called the encryption/decryption module) 400, is inserted into this slot. When the encryption/decryption module 400 inserted into the slot is pushed further in, a later mentioned connection I/F of the encryption/decryption module 400 and a connector 814 of the storage control section 310 are connected. The connector 814 is connected to a system switch 313. By this, the encryption/decryption module 400 physically connected to the connector 814 is connected to the storage system 300 via the later mentioned connection I/F, so as to execute processing responding to an instruction from the SVP 317 or to the encryption/decryption of data which is input to the connection I/F. Connection or disconnection of the encryption/decryption module 400 to/from the slot section 314 may be performed manually or automatically. The connection between the encryption/decryption module 400 and the connector 814 may be with or without actual contact.

The host I/F 311 is an interface device for performing data communication with a host computer 100 or another storage system. The host I/F 311 can be constructed as a micro computer system (e.g. circuit board) having a processor 3112, a memory 3123 and a port 3111. Specifically, if the host I/F 311 comprises a plurality of ports 3111, a plurality of processors 3112 and a switch where these composing elements and memory 3123, for example, are connected for switching the connection of these composing elements. Each port 3111 is a port for receiving a write request or a read request from the host computer 100. A WWN (World Wide Name), for example, is assigned to each port 3111 as information for identifying each port.

The storage I/F 315 is an interface device for performing data communication with a physical storage device 321. The storage I/F 315 can also be constructed as a micro computer system (e.g. circuit board) having a processor, memory and plurality of ports. The plurality of ports are ports that can be communicably connected with the physical storage device 321.

The cache memory 316 is a volatile or a non-volatile memory, and temporarily stores the data received from the host computer 10 or the data read from the physical storage device 321.

The shared memory 312 is a volatile or a non-volatile memory, for example, and stores management information which is referred to by the host I/F 311 or the storage I/F 315 for controlling the storage system 300. The management information is, for example, a port-LU mapping table 3121, LU-storage mapping table 3122, and decryption control table 3123. Each table 3121, 3122 and 3123 will be described later.

The system switch 313 interconnects the host I/F 311, storage I/F 315, cache memory 316, shared memory 312, SVP 317 and encryption/decryption module 400. As the system switch 313, an ultra high-speed crossbar switch, which transfers data by a high-speed switching operation, for example, can be used. Instead of the system switch 313, another type of connection section, such as a bus, may be used.

The SVP 317 is a device (e.g. circuit board) for maintaining and/or managing the storage system 300. The SVP 317 is connected to a second communication network, such as a LAN 500, and can communicate with a management terminal (computer, such as a personal computer) 600 via the LAN 500. The SVP 317 can be a control console, and the management terminal 600 can be an input/output console thereof.

The storage section 320 includes a plurality of physical storage devices 321. For the physical storage device 321, such a device as a hard disk drive, flexible disk drive, magnetic type drive, semiconductor memory (e.g. flash memory) drive, or optical disk drive, for example, can be used. A RAID group at a predetermined RAID level can be constructed by two or more physical storage devices 321. Using a storage space of two or more physical storage devices 321 constituting a RAID group, one or a plurality of logical storage devices (hereafter called a logical unit or LU) 321 can be configured.

The above is a configuration of the computer system according to the present embodiment. This configuration, however, is an example, and another configuration may be used. For example, the shared memory 312 and the cache memory 316 need not be separate memories, but a shared memory area and a cache memory area may be created in one memory. The storage control section 310 may be a circuit board comprising a CPU, a memory and a plurality of communication ports (in other words, a configuration that is simpler than the storage control section in FIG. 1). In this case, this CPU can execute the processing performed by the plurality of host I/Fs 311 and the storage I/F 315.

Figure 2:
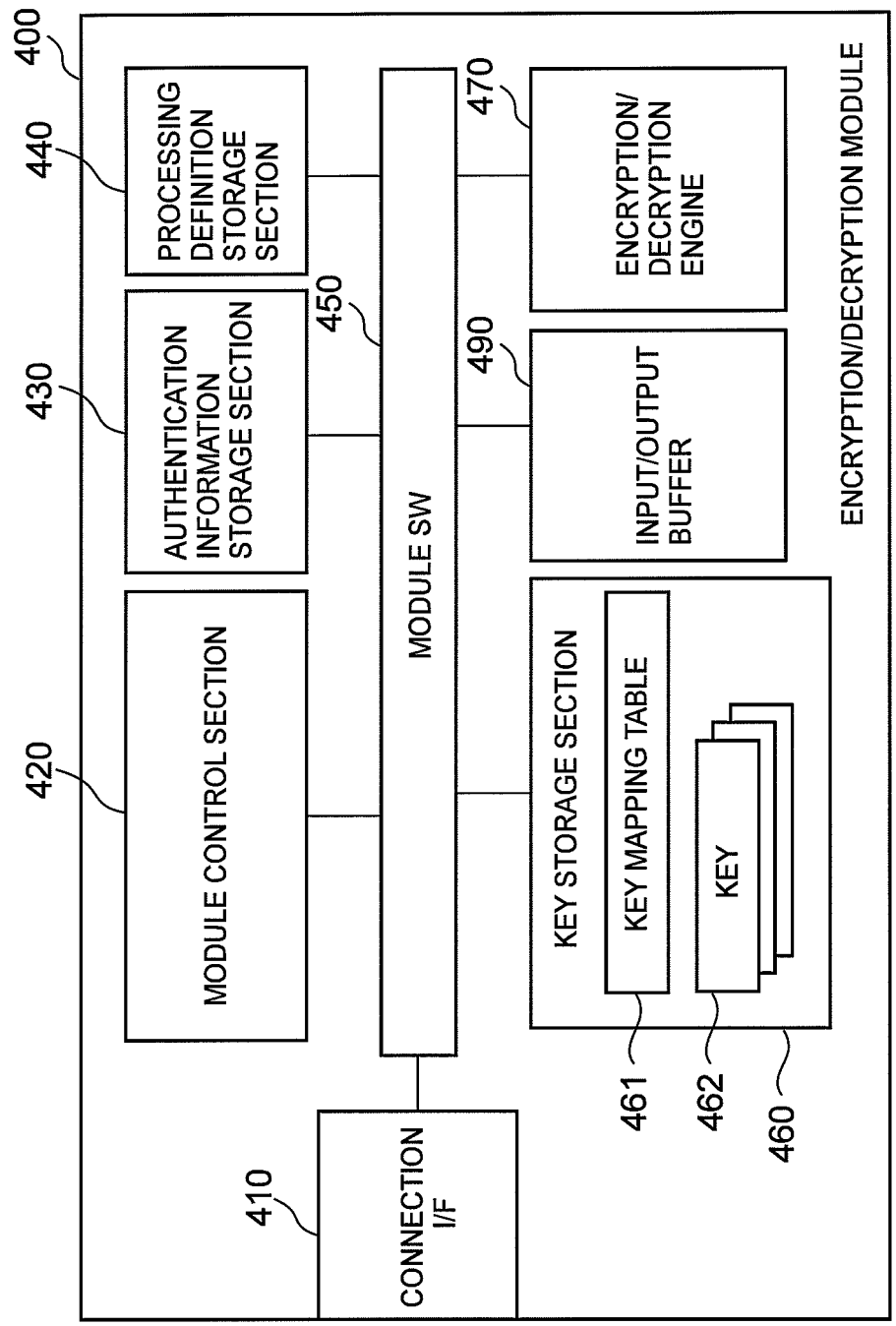
FIG. 2 is a diagram depicting a configuration example of the encryption/decryption module.

FIG. 2 shows a configuration example of the encryption/decryption module 400.

The encryption/decryption module 400 comprises a connection I/F 410, a module control section 420, an authentication information storage section 430, a processing definition storage section 440, an encryption/decryption engine 470, an input/output buffer 490, a key storage section 460, and a module switch ("module SW") 450. The plurality of storage sections 430, 440 and 460 are non-volatile memories, for example. Two or more storage sections out of the plurality of storage sections 430, 440 and 460 may be disposed in one memory.

The connection I/F 410 is an interface device which is connected to the connector 814 of the storage control section 310. The connection I/F 410 is connected to the module control section 420, the authentication information storage section 430, the processing definition storage section 440, the encryption/decryption engine 470 and the key storage section 460 via the module SW 450.

The module control section 420 is a processor (e.g. CPU), for example, which reads a computer program and executes it. The module control section 420 performs authentication (specifically connection authentication, and the later mentioned temporary authentication) for the storage system 300 of the encryption/decryption module 400, instructs the generation, updating or discarding of a key 462, sets or updates a key mapping table 461, or stores a processing definition information, which is information on the definition of a predetermined processing, to the encryption definition storage section 440.

The authentication information storage section 430 stores authentication information. The authentication information is general authentication information and special authentication information, for example. For general authentication information, a predetermined character string such as "guest" can be used. Initially special authentication information is not stored, and when a logical connection is enabled in the later mentioned connectability judgment processing using general authentication information, the special authentication information is added to the authentication information storage section 430, and hereafter connectability judgment processing is performed using this special authentication information. For special authentication, an identifier of the storage system 300, to which a logical connection of the encryption/decryption module 400 is enabled (hereafter storage system ID), can be used.

Processing definition information is stored in the processing definition storage section 440. Processing definition information is, for example, a migration ID (identifier of migration) and a module status information (information to indicate the module status). The module status information is, for example, the connection status information (information to indicate the state where the encryption or decryption of the input data is enabled), and the temporary status information (information to indicate the status where the encryption or decryption of data is not enabled, but temporary use, such as use for the copy destination of the key mapping table 461, is enabled).

The input/output buffer 490 is a storage area created in a memory, for example. The input/output buffer 490 temporarily stores the encrypted data or the unencrypted data which was input via the connection I/F 410 or the encrypted data by the encryption/decryption engine 470 or the unencrypted data.

The encryption/decryption engine 470 is an engine for encryption/decryption input data using a predetermined encryption/decryption scheme. This engine can be constructed by a hardware circuit, a microprocessor for executing an encryption/decryption program, or a combination thereof. Other than encryption or decryption, the encryption/decryption engine 470 can generate a key 462, for example, responding to an instruction from the module control section 420. The number of encryption/decryption schemes that the encryption/decryption engine 470 can execute can be two or more, and in this case, the encryption/decryption engine 470 can perform encryption or decryption using the encryption/decryption scheme selected from the two or more encryption/decryption schemes.

In the key storage section 460, one or more keys 462 and a key mapping table 461 are stored. The key 462 is information to indicate a key that is used for both encryption and decryption. The key mapping table 461 is a table to indicate an encryption target logical unit 322 storing data to be encrypted, and a key 462 with which the data is encrypted. Specifically, as FIG. 3 shows, a record registered in the key mapping table 461 is comprised of a module ID 4611, which is an identifier of the encryption/decryption module 400, an encryption/decryption scheme name 4612, which is a name of the encryption/decryption scheme, a key name 4613, which is a name of the key 462, and an encryption target 4614. The encryption target 4614 is information to indicate a logical unit 322 storing data to be encrypted. The encryption target 4614 is, for example, "All Storage" 46141, the port ID 46143, the host group ID 46144 and the LUN (Logical Unit Number) 46145. If All Storage 46141 is "Yes", the data stored in all the logical units 332 existing in the storage system 300 is the encryption target data. If All Storage 46141 is "No", the data stored in a part of the logical units 332 existing in the storage system 300 is the encryption target data. If All storage 46141 is "No", a logical unit 332 is specified by one or more information elements of the port ID 46143, host group ID 46144 and LUN 46145. For example, in the shared memory 312 of the storage system 300, information on a LUN of a logical unit 332 existing in the storage system 300 and the correspondence of the logical unit 332 and a port 3111 or a host group are stored, although this is not illustrated.

The host group is all or a part of a plurality of logical units 332 mapped in the port 3111, and is a group corresponding to a host computer 100. Specifically, a logical unit 332 belonging to a host group is provided to a host computer 332 corresponding to that host group, but is not provided to other host computers 332.

The unit specifying a logical unit 322 is not limited to a port or a host group, but other units can be used instead of or in addition to the above units. For example, SLPR or a host WWN can be used as the unit. SLPR stands for Storage Logical PaRtitioning, and is a logical part of the storage system 300. The host WWN is a WWN assigned to a port, which is not illustrated, of the host computer 332.

The encryption/decryption module 400 and the SVP 317 can refer to, set or update the tables 3121, 3122 and 3123 stored in the shared memory 312.

FIG. 4 shows a configuration example of the LU-storage mapping table 3122.

The LU-storage mapping table 3122 is a table to indicate the correspondence of a logical unit 322 and a physical storage device 321, and a logical unit 322 storing data and an encryption/decryption module 400 which encrypts or decrypts the data. Specifically, in the LU-storage mapping table 3122, a logical unit 322, an LUN 31211 of the logical unit 322, a storage ID 31222 that is an identifier of a storage device 321 which provides the logical unit 322, an address 31223 that is information to indicate an address in the storage device 321, and a module ID 31224 that is an identifier of an encryption/decryption module 400 corresponding to the logical unit 322, are recorded.

FIG. 5 shows a configuration example of the port-LU mapping table 3121.

The port-LU mapping table 3121 is a table to indicate the correspondence of a port 3111 and a logical unit 322, and a logical unit 322 storing data and an encryption/decryption module 400 which encrypts or decrypts the data. Specifically, in the port-LU mapping table 3121, a logical unit 322, a port ID 31211 which is an identifier of a port 3111 with which the logical unit 322 is associated, a host group ID 31212 which is an identifier of a host group including the logical unit 322, a LUN 31213 of the logical unit 322, and a module ID 31214 which is an identifier of an encryption/decryption module 400 corresponding to the logical unit 322, are recorded.

According to FIG. 5, two encryption/decryption modules can coexist. Specifically, data to be stored in the LU 322 with the LUN "LU#1" is encrypted/decrypted by a first encryption/decryption module 400 corresponding to the module ID "Module A", and data to be stored in LU 322 with the LUN "LU#3" is encrypted/decrypted by a second encryption/decryption module 400 corresponding to the module ID "Module B".

FIG. 6 shows a configuration example of the encoding control table 3123.

The encoding control table 3123 is a table to indicate a port 3111 from which data is output and whether that data is decrypted. Specifically, the decryption control table 3123 records a port ID 31231 which is an identifier of a port 3111, and decryption YES/NO 31232 which is information to indicate whether the data output from this port 3111 is decrypted. If decryption YES/NO 31232 is "YES", then data which is output via the port 3111 corresponding to this decryption YES/NO 31232 is decrypted, and if decryption YES/NO 31232 is "NO", then data which is output via the port 3111 corresponding to this decryption YES/NO 31232 is not decrypted. Initially decryption YES/NO 31232 is "YES", which is changed to "NO" or returned to "YES" according to the decryption requirements.

Now various processings to be executed according to the present embodiment will be described.

Figure 7:
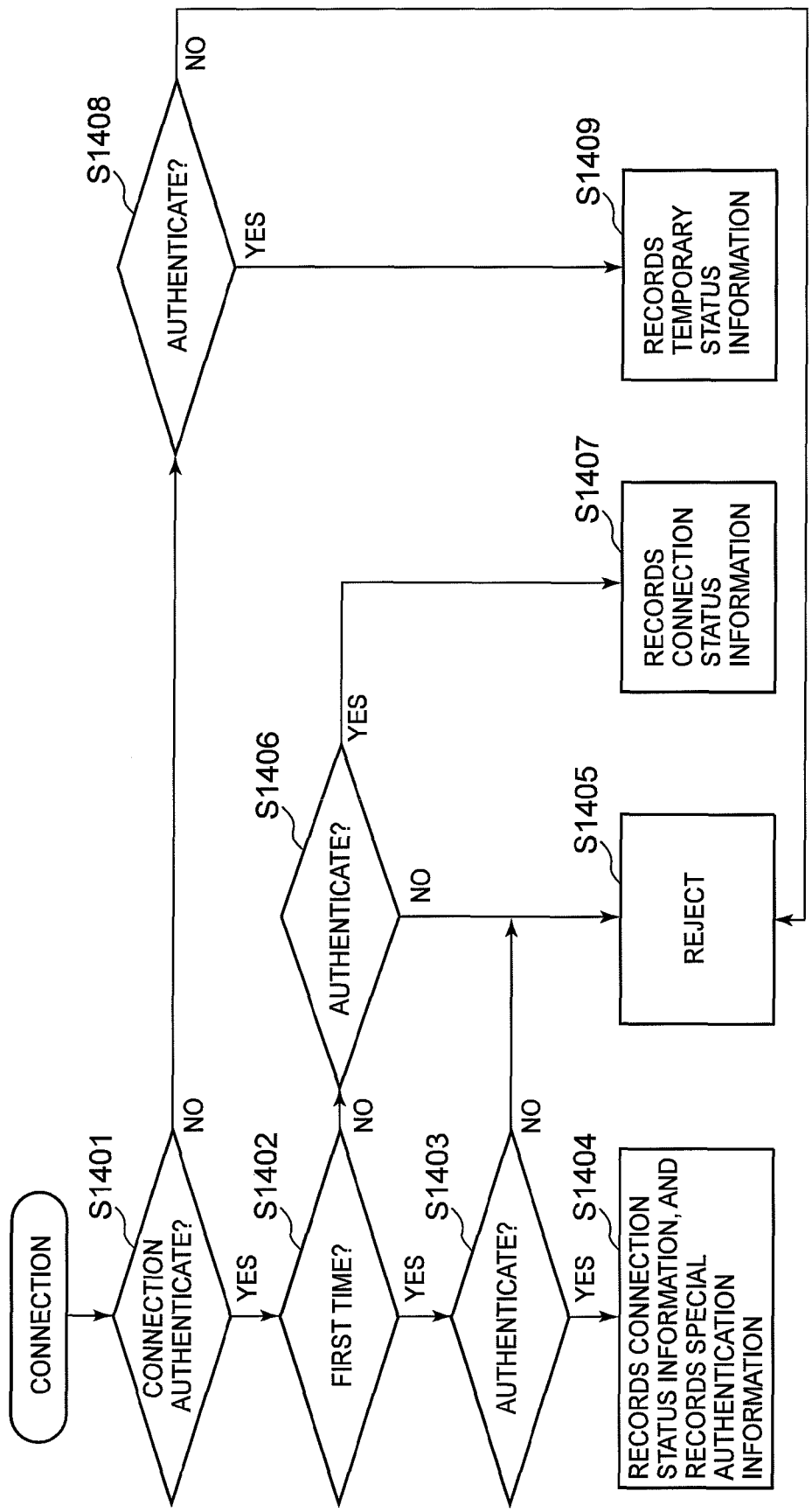
FIG. 7 is a flow chart depicting an example of the processing performed when the encryption/decryption module is physically connected to the storage system.

FIG. 7 is a flow chart depicting an example of the processing executed when the encryption/decryption module 400 is physically connected with the storage system 300. In the drawings, "S" is used instead of "Step". In the description of FIG. 7, the encryption/decryption module 400 physically connected this time is referred to as the "target module 400".

The SVP 317 detects that the target module 400 is physically connected, and judges which one of connection authentication or temporary authentication will be executed (Step 1401). If it is judged as executing connection authentication, processing advances to Step 1402, and if it is judged as executing temporary authentication, processing advances to Step 1408. For example, when a physical connection is determined, the SVP 317 may inquire a user of the management terminal 600 which authentication will be executed, so that SVP 317 judges which one of connection authentication and temporary authentication will be executed based on the reply received from the user of the management terminal 600. Or an input section (e.g. mechanical switch), for specifying which one of connection authentication and temporary authentication will be performed, may be disposed in the first encryption/decryption module 400 or the first slot section 314, so that SVP 317 judges which one of the connection authentication and temporary authentication will be performed based on the specification received via the input section. The connection authentication is an authentication where the physically connected target module 400 is used for the encryption/decryption of data, and temporary authentication is an authentication where the target module 400 is not used for the encryption/decryption of data, but is used temporarily, such as for the copy destination of the key mapping table.

In Step 1402, the SVP 317 judges whether this is the first connection authentication for the target module 400. Specifically, the SVP 317 may inquire to the module control section 420 whether special authentication information exists so that the SVP 317 judges whether this is the first connection authentication or not based on the reply to this inquiry. In this case, it is judged as not the first connection authentication if the reply indicates that special authentication information exists, and it is judged as the first connection authentication if the reply indicates that special authentication information does not exist. If it is judged as the first connection authentication, processing advances to Step 1403, and if it is judged as not the first connection authentication, processing advances to Step 1406.

In Step 1403, the SVP 317 acquires general authentication information from the target module 400, and performs connectability judgment on whether connection authentication is performed or not using this general authentication information. For example, the SVP 317 receives a character string (e.g. password and/or another type of character string) from the management terminal 600, and judges whether the received character string matches the character string indicated by the general authentication information. In this case, if there is a match, it is judged that connection authentication is performed, and processing advances to Step 1404, and if there is a mismatch, it is judged that connection authentication is not performed, and processing advances to Step 1405.

In Step 1404, the SVP 317 stores the connection status information to the processing definition storage section 440 of the target module 400. The SVP 317 also stores the storage system ID of the storage system 300 to the authentication information storage section 430 of the target module 400 as special authentication information.

In Step 1405, the SVP 317 rejects use of the target module 400. For example, the SVP 317 may send a message, to indicate that use of the target module 400 is rejected, to the management terminal 600 so that the management terminal 600 displays the message. Or the SVP 317 may eject the target module 400 from the slot section 314 by sending an eject command to the slot section 314 where the target module 400 is inserted.

In Step 1406, the SVP 317 acquires special authentication information from the target module 400, and judges connectability on whether connection authentication is performed or not using this special authentication information. For example, the SVP 317 reads the storage system ID of the storage system 300 from the shared memory 312 or another storage area, and judges whether the storage system ID matches with the storage system ID indicated by the special authentication information. In this case, if there is a match, it is judged that connection authentication is performed, and processing advances to Step 1407, and if there is a mismatch, it is judged that connection authentication is not performed, and processing advances to Step 1405.

In Step 1407, the SVP 317 stores the connection status information to the processing definition storage section 440 of the target module 400.

In Step 1408, the SVP 317 performs temporary connectability judgment on whether temporary authentication is performed. For example, the SVP 317 acquires general authentication information from the target module 400, receives a character string (e.g. password and/or another type of character string) from the management terminal 600, and judges whether the received character string matches the character string indicated by the general authentication information. In this case, if there is a match, it is judged that temporary authentication is performed, and processing advances to Step 1409, and if there is a mismatch, it is judged that temporary authentication is not performed, and processing advances to Step 1405.

In Step 1409, the SVP 317 stores the temporary status information to the processing definition storage section 440 of the target module 400.

The above is an example of the processing flow which is performed when the target module 400 is physically connected to the storage system 300. In this example, the subject of each step is the SVP 317, but may be a module control section 420 in the target module 400, instead of or in addition to the SVP 317. For example, the module control section 420 or the module control section 420 and the SVP 317 in cooperation may decide whether connection authentication is performed, or temporary authentication is performed for the target module 400.

Also, for example, the target module 400 and the storage system 300 may correspond one-to-one, so that connection authentication performed for the target module 400 is not executed by another storage system 300. Specifically, the number of storage system IDs to be stored in the authentication information storage section 430 of the target module 400 is one, for example.

Figure 8:
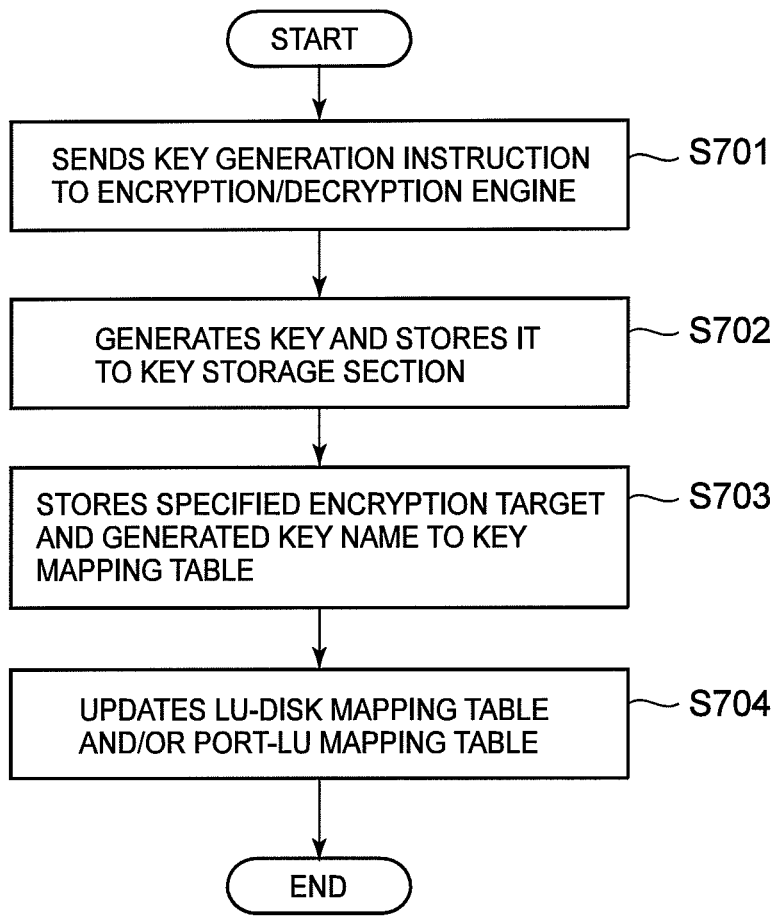
FIG. 8 is a flow chart depicting an example of key setting processing.

FIG. 8 is a flow chart depicting an example of the key setting processing. In the description on FIG. 8, the encryption/decryption module 400 to be the target of the key setting processing is called the "target module 400".

In Step 701, the module control section 420 in the target module 400, for which connection authentication or temporary authentication was performed, receives a key generation command where an encryption target 4614 is specified, and sends a key generation instruction to the encryption/decryption engine 470 responding to this key generation command.

In Step 702, the encryption/decryption engine 470 receives the key generation instruction from the module control section 420, and generates a key 462 responding to this key generation instruction. The key 462 is generated based on the encryption intensity which is set in the encryption/decryption engine 470 or in another location, for example. The encryption/decryption engine 470 or the module control section 420 stores the generated key 462 in the key storage section 460.

In Step 703, the module control section 420 stores a record, which is comprised of the encryption target 4614 specified in the key generation command received in Step 701, the key name 4613, which is a name of the key 462 stored in Step 702, the name of the encryption/decryption scheme (encryption/decryption scheme name) 4612 by the encryption/decryption engine 470, and the identifier (module ID) 4611 of the encryption/decryption module 400 which this module control section 420 belongs to, in the key mapping table 461.

In Step 704, the module control section 420 or the SVP 317 updates the port-LU mapping table 3121 and LU-storage mapping table 3122 based on the record stored in Step 703. For example, if "LU#1" is in LUN 46145 as the encryption target 4614 in the stored record, "LU#1" is stored in LUN 31213 in the port-LU mapping table 3121, the port ID 31211 and host group ID 31212 corresponding to the LUN "LU#1" are stored, and the module ID 4611 in the record stored in Step 703 is stored in module ID 31214. Further, in the LU-storage mapping table 3122, the module ID 4611 in the record stored in Step 703 is stored in the module ID 31224 corresponding to LUN 31221 "LU#1".

The above is a description on the key setting processing. By this key setting processing, a logical unit 322, which stores data to be encrypted using the target module 400 inserted into the slot section 314, is defined.

Figure 9:
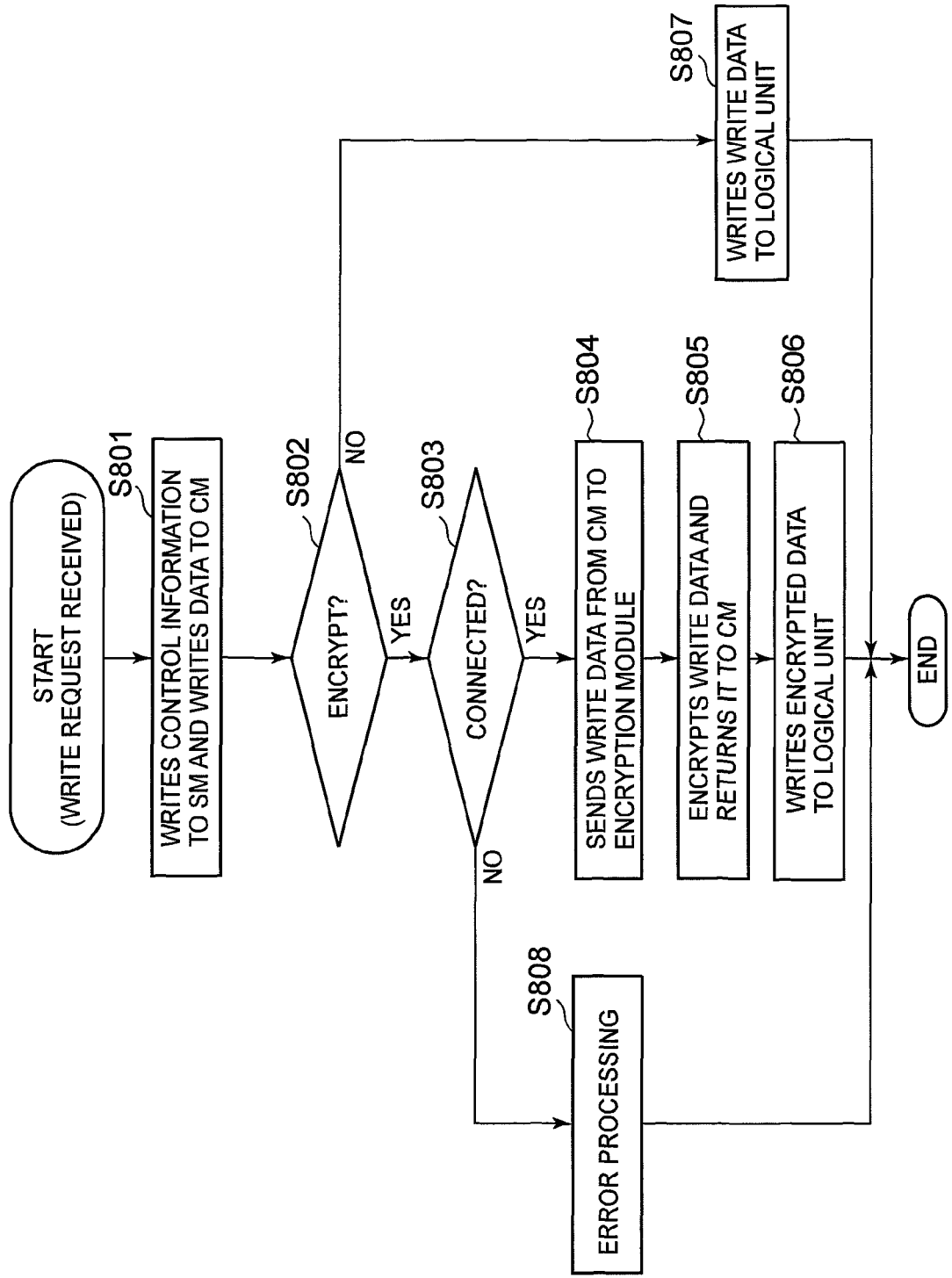
FIG. 9 is a flow chart depicting an example of the write processing which is executed in response to a write request received from the host computer.

FIG. 9 is a flow chart depicting an example of write processing, which is performed responding to a write request received from the host computer. In the write request, LUN and address (e.g. logical block address) are specified. In the description in FIG. 9, data to be written responding to a write request is called the "write data".

In Step 801, the host I/F 311 refers to the port-LU mapping table 3121 and LU-storage mapping table 3122 using the LUN specified in the write request as a key, and specifies the module ID, disk ID and address corresponding to the specified LUN. Then the host I/F 311 writes the write data (unencrypted data) according to the received write request to the cache memory 316, and writes the control information (e.g. information to indicate a location where the write data is written) based on the specified disk ID and address to the shared memory 312.

In Step 802, the host I/F 311 judges whether the value of the module ID specified in Step 801 is "NONE" or not. If the value of the module ID is "NONE", processing advances to Step 807, and if the value of the module ID is not "NONE", but is a valid value, then processing advances to Step 803.

In Step 803, the host I/F 311 judges whether the encryption/decryption module 400, which is identified based on the module ID specified in Step 801 (called the "target module 400" in the description in FIG. 9), is connected to any of the slot sections 314. Specifically, the host I/F 311 inquires the module control section 420 in the physically connected encryption/decryption module 400 about the module ID and module status information, and receives the module ID and module status information from the module control section 420 which responds to the inquiry. If the module ID matches the module ID specified in Step 801, and the module status information is connection status information, the host I/F 311 judges that the target module 400 is connected. When it is judged that the target module 400 is connected, processing advances to Step 804, and if it is judged as not connected, processing advances to Step 808.

In Step 804, the host I/F 311 sends an encryption command, write data (unencrypted data) which was written to the cache memory 316 in Step 801, and encryption target information (e.g. LUN, port ID or host group ID) to the module control section 420 of the target module 400. Responding to the encryption command, the module control section 420 writes the received write data (unencrypted data) to the input/output buffer 490. The module control section 420 specifies the encryption/decryption scheme name 4612 and key name 4613 corresponding to the received encryption target information in the key mapping table 461. Then the module control section 420 specifies the encryption/decryption scheme corresponding to the encryption/decryption scheme name 4612, the key 462 corresponding to the specified key name 4613, and the received write data (unencrypted data) to the encryption/decryption engine 470.

In Step 805, the encryption/decryption engine 470 reads the specified write data (unencrypted data) from the input/output buffer 490, and encrypts this write data (unencrypted data) by the specified encryption/decryption scheme using the specified key 462. For example, the encryption/decryption engine 470 is a CPU, and the CPU executes an encryption program for encrypting data by the specified encryption/decryption scheme, whereby the write data (unencrypted data) can be encrypted using the key 462 which was input. The encryption/decryption engine 470 writes the write data (encrypted data) to the input/output buffer 490. The module control section 420 writes the write data (encrypted data) written in the input/output buffer 490 to the cache memory 420.

In Step 806, the disk I/F 315 writes the write data (encrypted data) written in the cache memory 420 to the logical unit 322 corresponding to the LUN specified in the write request (specifically, a physical storage area in a storage device 321 which provides the logical unit 322) based on the control information written in the shared memory 312.

In Step 807, the disk I/F 315 writes the write data (unencrypted data) written in the cache memory 420 to the logical unit 322 corresponding to the LUN specified in the write request, based on the control information written in the shared memory 312.

In Step 808, the host I/F 311 executes error processing. For example, the host I/F 311 responds with an error to the host computer 100 which sent the write request.

Figure 10:
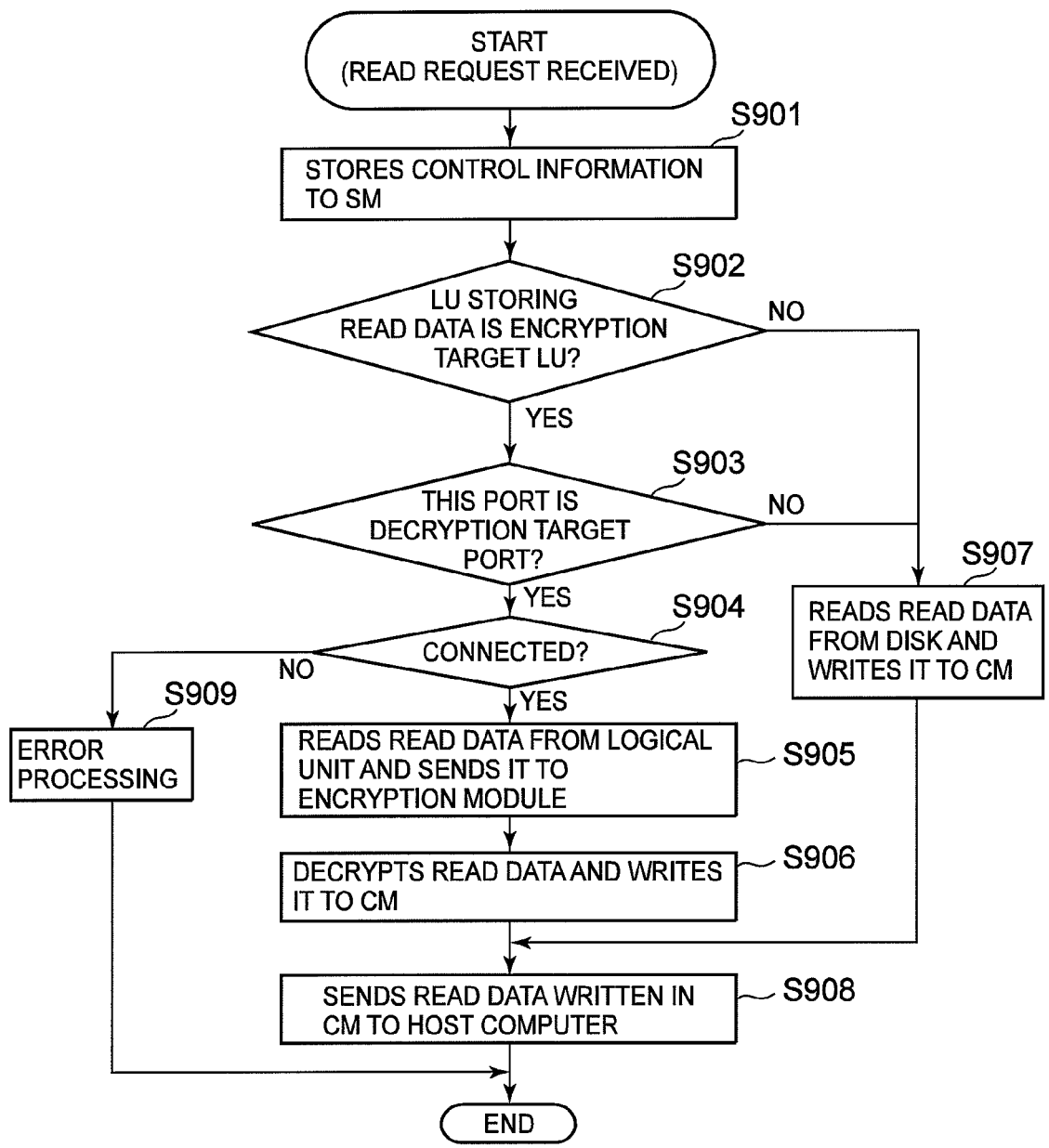
FIG. 10 is a flow chart depicting an example of the read processing which is executed in response to a read request received from the host computer.

FIG. 10 is a flow chart depicting an example of read processing, which is performed responding to a read request received from the host computer. In the read request, LUN and address (e.g. logical block address) are specified. In the description on FIG. 10, data to be read responding to the read request is called the "read data".

In Step 901, the host I/F 311 refers to the port-LU mapping table 3121 and LU-storage mapping table 3122 using the LUN specified in the read request as a key, and specifies the module ID, disk ID and address corresponding to the specified LUN. Then the host I/F 311 writes control information (e.g. information to indicate the location from which the data is read) based on the specified disk ID and address in the shared memory 312.

In Step 902, the host I/F 311 judges whether the value of the module ID specified in Step 901 is "NONE" or not. If the value of the module ID is "NONE", processing advances to Step 907, and if the value of the module ID is not "NONE", but is a valid value, processing advances to Step 903.

In Step 903, the host I/F 311 specifies a port corresponding to the LUN in the read request, and judges whether the value of the decryption YES/NO 31232 corresponding to the port is "YES" or "NO". If "YES", processing advances to Step 904, and if "NO", processing advances to Step 907.

In Step 904, the host I/F 311 judges which slot section 314 the encryption/decryption module 400, identified based on the module ID specified in Step 901 (called the "target module 400" in the description in FIG. 10), is connected to. If it is judged that the target module 400 is connected, processing advances to Step 905, and if it is judged that the target module 400 is not connected, processing advances to Step 909.

In Step 905, the disk I/F 315 reads the read data (encrypted data) from the logical unit 322 based on the control information written in the shared memory 312, and writes the read data (encrypted data) which has been read to the cache memory 316. The host I/F 311 sends the decryption command, the read data (encrypted data) written in the cache memory 316, and the encryption target information (e.g. LUN, port ID or host group ID) to the module control section 420 of the target module 400.

In Step 906, responding to the decryption command, the module control section 420 writes the received read data (encrypted data) to the input/output buffer 490. The module control section 420 specifies the encryption/decryption scheme name 4612 and key name 4613 corresponding to the received encryption target information in the key mapping table 461. Then the module control section 420 specifies the encryption/decryption scheme corresponding to the specified encryption/decryption scheme name 4612, the key 462 corresponding to the specified key name 4613, and the received read data (encrypted data), to the encryption/decryption engine 470. The encryption/decryption engine 470 reads the specified read data (encrypted data) from the input/output buffer 490, and decrypts the read data (encrypted data) by the specified encryption/decryption scheme using the specified key 462. The encryption/decryption engine 470 writes the decrypted read data (unencrypted data) to the input/output buffer 490. The module control section 420 writes the read data (unencrypted data), written in the input/output buffer 490, to the cache memory 420.

In Step 907, the disk I/F 315 reads the read data (encrypted data or unencrypted data) from the logical unit 322 based on the control information written in the shared memory 312, and writes the read data (encrypted data or unencrypted data) which has been read to the cache memory 316.

In Step 908, the host I/F 311 sends the read data (encrypted data or unencrypted data) written in the cache memory 316 to the host computer 100 which sent the read request.

In Step 909, the host I/F 311 executes error processing. For example, the host I/F 311 responds with an error to the host computer 100 which sent the read request.

Figure 11:
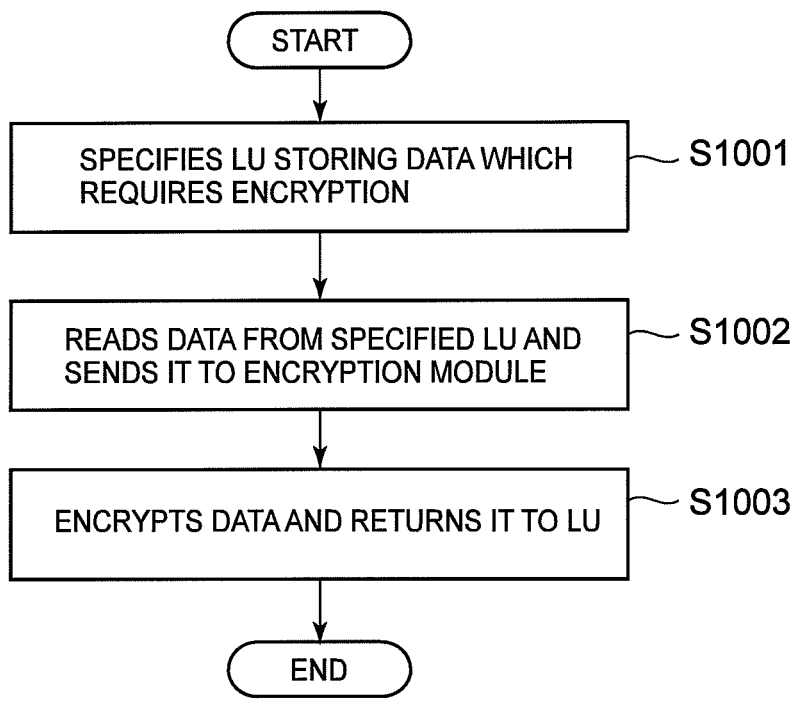
FIG. 11 is a flow chart depicting an example of stored data encryption processing.

FIG. 11 is a flow chart depicting an example of storage data encryption processing which is a processing for encrypting unencrypted data stored in the logical unit. This storage data encryption processing is started when the SVP 317 receives the storage data encryption processing instruction from the management terminal 600. In the storage encryption processing instruction, the module ID 4611, encryption/decryption scheme name 4612, key name 4613 and encryption target 4614, for example, are specified. The encryption/decryption module 400 identified based on the module ID 4614 is called the "target module 400" in the description on FIG. 11.

In Step 1001, the SVP 317 specifies an LU 322 which stores data requiring encryption based on the specified encryption target 4614. For example, if the encryption target 4614 is LUN 46145, then LU 322 is specified from this LUN 46145, and if the encryption target 4614 is port ID 46143, then the LUN corresponding to this port ID 46143 is specified based on the configuration information (stored in the shared memory 312, for example), which is not illustrated, and LU 322 is specified from this LUN.

In Step 1002, the SVP 317 instructs the disk I/F 311 to read data (unencrypted data) from the specified LU 322, and responding to this instruction, the disk I/F 311 reads the data (unencrypted data) from this LU 322, and writes it to the cache memory 316. The SVP 317 sends the encryption instruction and data (unencrypted data) on the cache memory 316 to the target module 400. The SVP 317 sends the specified module ID 4611, encryption/decryption scheme name 4612, key name 4613 and encryption target 4614, to the target module 400.

In Step 1003, the module control section 420 in the target module 400 writes the data (unencrypted data) from the SVP 317 to the input/output buffer 490 responding to the encryption instruction, and adds the record comprised of the module ID 4611 from the SVP 317, encryption/decryption scheme name 4612, key name 4613 and encryption target 4614, to the key mapping table 461. Then the module control section 420 has the encryption/decryption engine 470 encrypt the data (unencrypted data) written in the input/output buffer 490 based on the added record. The data encrypted by the encryption/decryption engine 470 is temporarily stored in the input/output buffer 490, and is transferred to and stored in the cache memory 316. The encoded data stored in the cache memory 316 is written to the LU 322 from which the data before encryption has been read. The encrypted data may be written to another LU 322. In this case, the LUN of the read source LU 322 and the LUN of this other LU 322 may be replaced in the storage system 300, for example.

Steps 1002 and 1003 are executed for each LU 322 specified in Step 1001.

The above is the description on the stored data encryption processing. In the stored data encryption processing, a part or all of the processing executed by the SVP 317 may be performed by the encryption/decryption module 400 alone, or in cooperation with the SVP 317.

Figure 12:
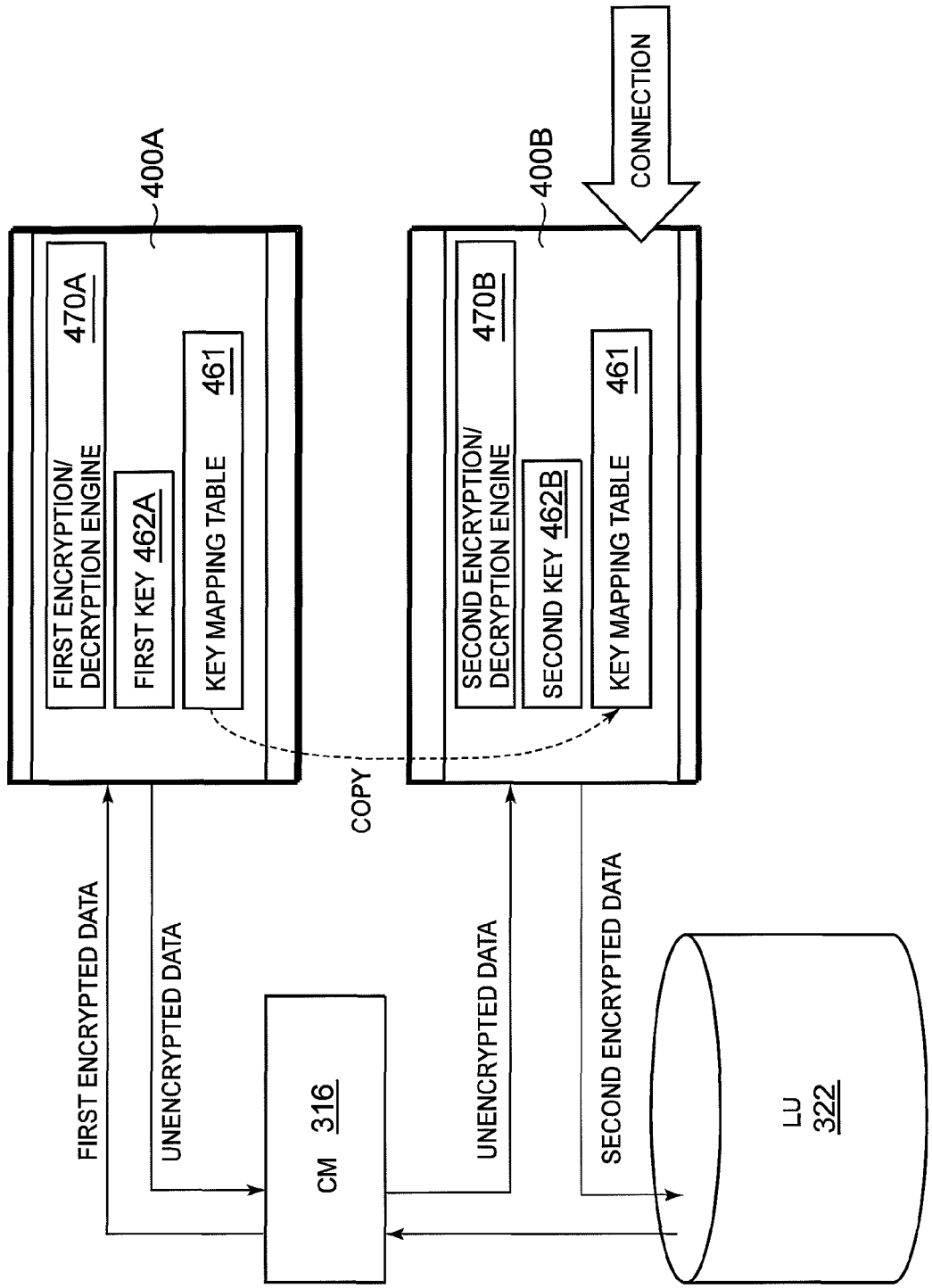
FIG. 12 is a diagram depicting an overview of the encryption/decryption scheme change processing.
Figure 13:
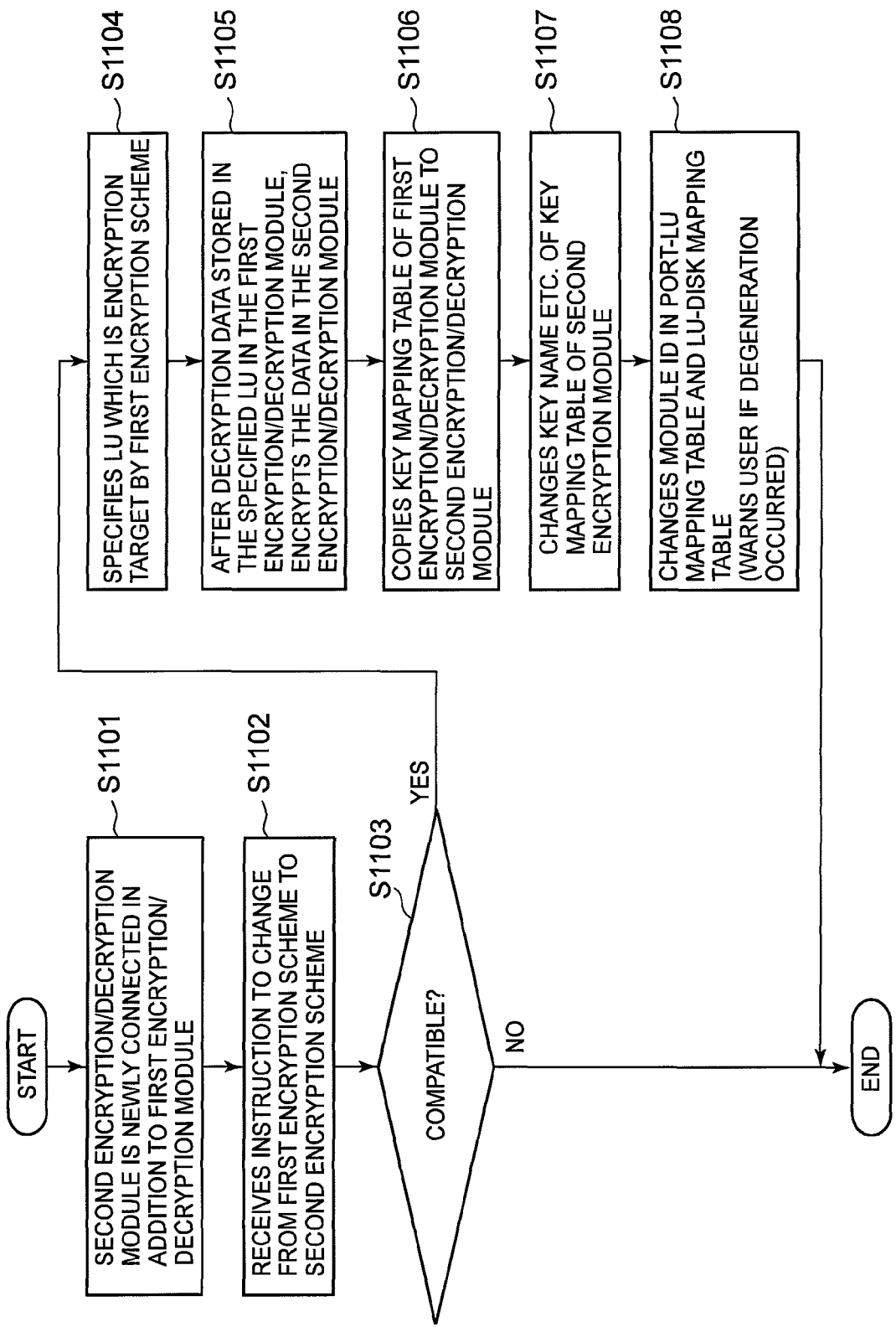
FIG. 13 is a flow chart depicting an example of the encryption/decryption scheme change processing.

FIG. 12 shows an overview of the encryption/decryption scheme change processing. FIG. 13 is a flow chart depicting an example of the encryption/decryption scheme change processing. Now the encryption/decryption scheme change processing will be described with reference to FIG. 12 and FIG. 13.

In Step 1101, in addition to a first encryption/decryption module 400A, the second encryption/decryption module 400B is newly connected. In the following description, it is assumed that a first encryption/decryption engine 470A for encrypting/decryption data by the first encryption/decryption scheme, a first key 462A and a key mapping table 461 are stored in the first encryption/decryption module 400A, and a second encryption/decryption engine 470B for encryption/decryption data by the second encryption/decryption scheme, a second key 462B and a key mapping table 461 are stored in the second encryption/decryption module 400B. It is also assumed that the second encryption/decryption scheme is a newer type of encryption/decryption scheme than the first encryption/decryption scheme. The data encrypted by the first encryption/decryption scheme is called the "first encrypted data", and the data encrypted by the second encryption/decryption scheme is called the "second encrypted data".

In Step 1102, the SVP 317 receives a scheme change instruction to change the encrypted data by the first encryption/decryption scheme into encrypted data by the second encryption/decryption scheme from the management terminal 600.

In Step 1103, the SVP 317 judges the compatibility of the first encryption/decryption scheme and the second encryption/decryption scheme. For example, if the size of the encrypted data differs between the case of encrypting data by the first encryption/decryption scheme and the case of encrypting same sized data by the second encryption/decryption scheme, it is judged as incompatible, and if the data size matches, it is judged as compatible. If it is judged as incompatible, the encryption/decryption scheme change processing ends, and if it is judged as compatible, processing advances to Step 1104.

In Step 1104, the SVP 317 specifies the logical unit 322 storing the first encrypted data. Specifically, for example, the SVP 317 refers to the key mapping table 461 in the first encryption/decryption module 400A, specifies an encryption target 4614 corresponding to the first encryption/decryption scheme name, and specifies a logical unit 322 storing the first encrypted data based on this encryption target 4614.

In Step 1105, the SVP 317 instructs the disk I/F 315 to read data from the logical unit 322 specified in Step 1104. Responding to this instruction, the disk I/F 315 reads the first encrypted data from the specified logical unit 322, and writes it to the cache memory 316. The SVP 317 sends the decryption instruction and the first encrypted data on the cache memory 316 to the first encryption/decryption module 400A. In the first encryption/decryption module 400A, the first encryption/decryption engine 470A decrypts the first encrypted data using the first key 462 by the first encryption/decryption scheme. By this, the first encrypted data becomes unencrypted data. The unencrypted data is output from the first encryption/decryption module 400A, and is written to the cache memory 316. The SVP 317 sends the encryption instruction and the unencrypted data on the cache memory 316 to the second encryption/decryption module 400B. In the second encryption/decryption module 400B, the second encryption/decryption engine 470B encrypts the unencrypted data using the second key 462 by the second encryption/decryption scheme. By this, the unencrypted data becomes the second encrypted data. The second encrypted data is output from the second encryption/decryption module 400B, and is written to the cache memory 316. The disk I/F 315 writes the second encrypted data on the cache memory 316 to the logical unit 322 specified in Step 1104. The write destination of the second encrypted data may be a logical unit which is different from the logical unit 322 storing the first encrypted data. In this case, in the storage system 300, the LUN of the LU 322 storing the first encrypted data and the LUN of the LU 322 storing the second encrypted data may be replaced.

In Step 1106, the SVP 317 copies the information stored in the key mapping table 461 in the first encryption/decryption module 400A to the key mapping table 461 in the second encryption/decryption module 400B (the key mapping table 461 itself in the first encryption/decryption module 400A may be copied to the second encryption/decryption module 400B).

In Step 1107, the SVP 317 sends an instruction to change the encryption/decryption scheme name and key name to the module control section 420 in the second encryption/decryption module 400B. Then responding to the change instruction, the module control section 420 in the second encryption/decryption module 400B changes the name of the first encryption/decryption scheme in the key mapping table 461 to the name of the second encryption/decryption scheme, and changes the name of the first key 462 to the name of the second key 462.

In Step 1108, the SVP 317 changes the module ID (e.g. "Module A") corresponding to the first encryption/decryption module 400A in each port-LU mapping table 3121 and LU-storage mapping table 3122 to the module ID (e.g. "module B") corresponding to the second encryption/decryption module 400B. In Step 1108, it may be judged whether the encryption/decryption scheme has been deteriorated by changing the encryption/decryption scheme by the SVP 317, and if judged as deteriorated (e.g. if judged that the encryption/decryption scheme after change is older than the encryption/decryption scheme before change), a warning message may be sent to the management terminal 600.

The above is the description on the encryption/decryption scheme change processing. According to the encryption/decryption scheme change processing, the encryption/decryption scheme of the encrypted data stored in the logical unit 322 and the data to be stored in the future can be changed from the first encryption/decryption scheme to the second encryption/decryption scheme within one storage system 300 having the logical unit 322. This change can be performed without releasing the unencrypted data outside the storage system 300.

In the encryption/decryption scheme change processing, a part of all of the processing executed by the SVP 317 may be performed by the first encryption/decryption module 400A alone, or in cooperation with the SVP 317 or the second encryption/decryption module 400B, or by the second encryption/decryption module 400B alone, or in cooperation with the SVP 317 or the first encryption/decryption module 400B.

Figure 14:
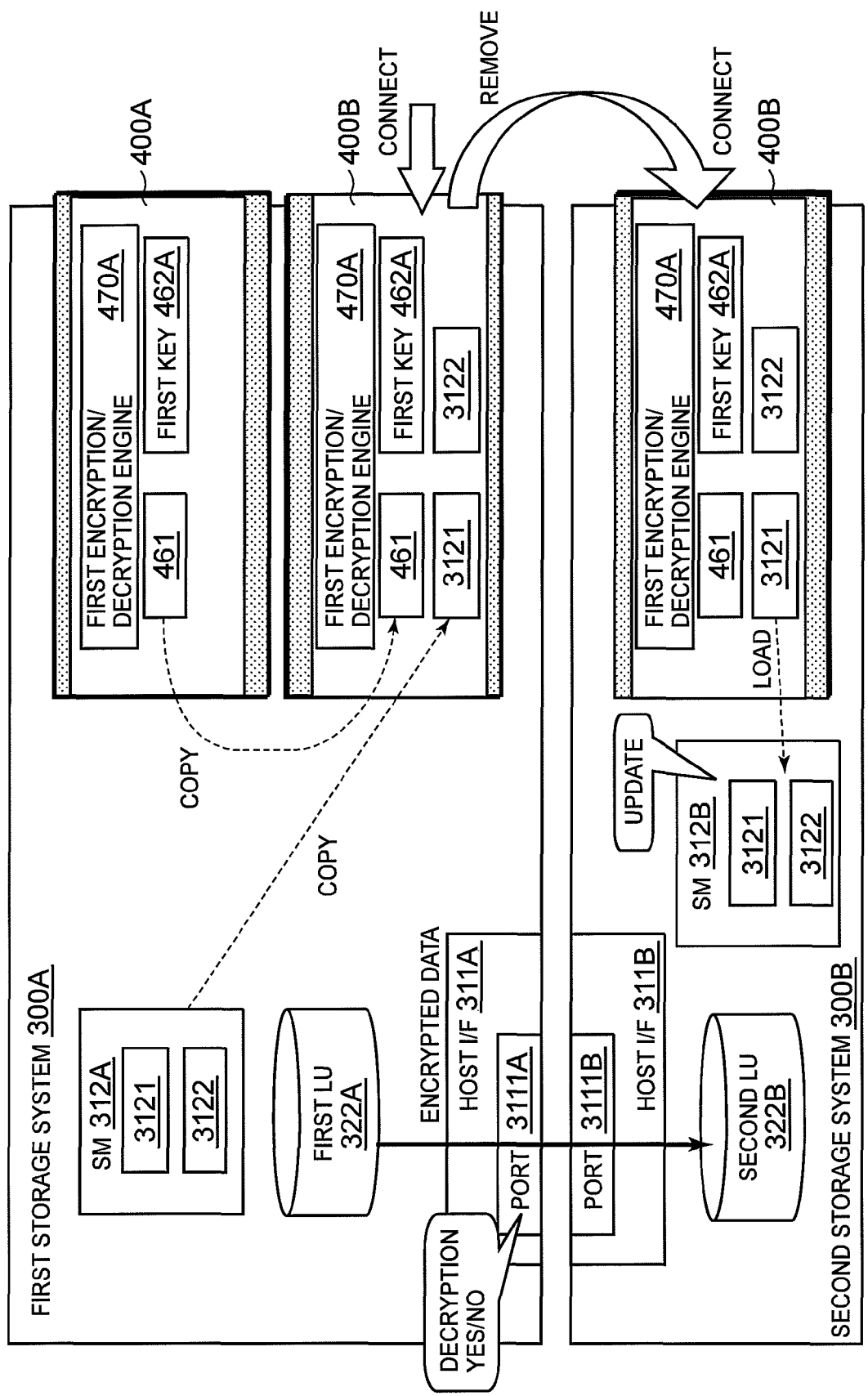
FIG. 14 is a diagram depicting an overview of data migration processing.
Figure 15:
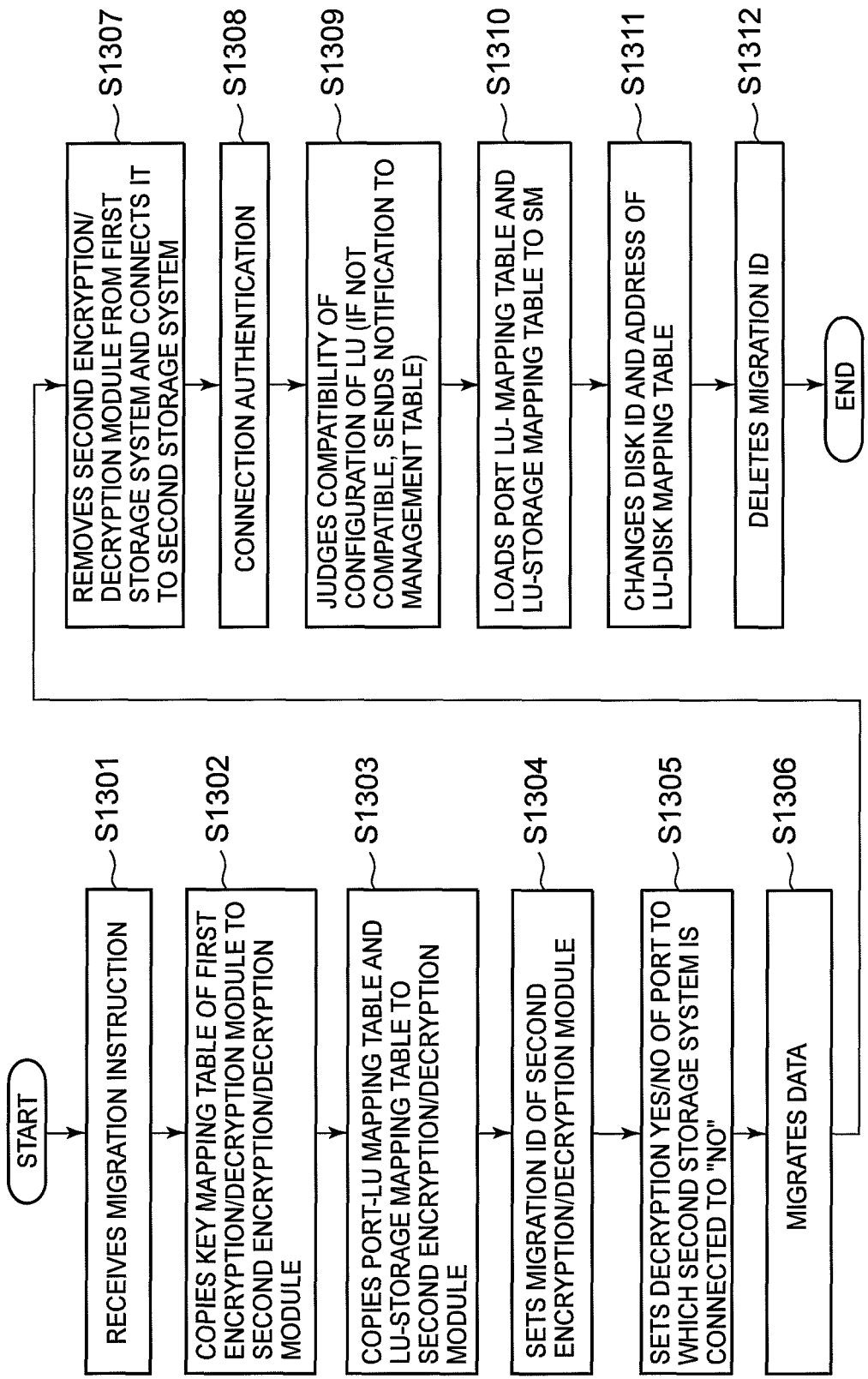
FIG. 15 is a flow chart depicting an example of data migration processing.

FIG. 14 shows an overview of the data migration processing. FIG. 15 is a flow chart depicting an example of the data migration processing. Now the data migration processing will be described with reference to FIG. 14 and FIG. 15.

A port 3111A of a host I/F 311A in a first storage system (migration source storage system) 300A and a port 3111B of a host I/F 311B in a second storage system (migration destination storage system) 300B are connected via a cable. An SVP 317 existing in the first storage system 300A is called the "first SVP 317", and an SVP 317 existing in the second storage system 300B is called the "second SVP 317".

A first encryption/decryption module 400A is connected to the first storage system 300A. The first encryption/decryption module 400A has a first encryption/decryption engine 470A for performing encryption and decryption by the first encryption/decryption scheme, a first key 462A and a key mapping table 461. In all the LUs existing in the first storage systems 300A, a first encrypted data, which is data encrypted using the first key 462A by the first encryption/decryption scheme, is stored. FIG. 14 shows the first LU 322 A as a representative.

A second encryption/decryption module 400B is connected to the first storage system 300A. The second encryption/decryption engine 400B has a first encryption/decryption engine 470A for performing encryption/decryption by the first encryption/decryption scheme, a first key 462A and a key mapping table 461.

In Step 1301, the first SVP 317 receives an instruction to migrate data from the first storage system 300A to the second storage system 300B from the management terminal 600.

In Step 1302, responding to this migration instruction, the first SVP 317 copies the information recorded in the key mapping table 461 in the first encryption/decryption module 400A to the key mapping table 461 in the second encryption/decryption module 400B (the key mapping table 461 itself in the first encryption/decryption module 400A may be copied to the second encryption/decryption module 400B).

In Step 1303, the first SVP 317 copies the port-LU mapping table 3121 and LU-storage mapping table 3122 stored in the shared memory 312 to the second encryption/decryption module 400B.

In Step 1304, the first SVP 317 sends the migration ID, which is information for identifying migration this time, to the second encryption/decryption module 400B. The module control section 420 in the second encryption/decryption module 400A writes the migration ID to the processing definition storage section 440. The migration ID can be used for authentication information (e.g. the migration ID can be comprised of an ID for authentication and password).

In Step 1305, the first SVP 317 changes the decryption YES/NO 31232 corresponding to the port 3111A connected to the second storage system 300B (decryption YES/NO 31232 corresponding to the port ID 31231 of the port 3111A, recorded in the decryption control table 3123) from "YES" to "NO".

In Step 1306, data existing in each LU of the first storage system 300A migrates to each LU in the second storage system 300B. Specifically, an LU pair is formed between each LU in the first storage system 300A and each LU in the second storage system 300B respectively, for example, and data migrates between LUs forming an LU pair. For example, an LU pair is formed between a first LU 322A and a second LU 322B, and data migrates from the first LU 322A to the second LU 322B.

This migration is started by the first SVP 317 instructing migration to the host I/F 311A when the decryption YES/NO 31232 corresponding to the port 3111A is set to "NO". Responding to this instruction, the host I/F 311A refers to the migration configuration information (information to indicate an LU and an LU forming an LU pair), which is stored in the shared memory 312 and is not illustrated, and executes migration based on this migration configuration information. In the migration, data is output from the port 3111A, but decryption YES/NO 31232 corresponding to a port 3111A is "NO", so the host I/F 311A does not decrypt the encrypted data read from the LU 322 (that is, does not instruct decryption to the first encryption/decryption module 400A), and transfers it to the second storage system 300B. In the second storage system 300B, the host I/F 311B receives the encrypted data. This encrypted data is stored in the LU in the second storage system 300B.

In Step 1307, the second encryption/decryption module 400B is disconnected from the first storage system 300A, and the second encryption/decryption module 400B is connected to the second storage system 300B.

In Step 1308, the second SVP 317 performs connection authentication for the second encryption/decryption module 400B. The flow up to the connection authentication is the same as described with reference to FIG. 7. Then the second SVP 317 judges whether a migration ID is stored in the second encryption/decryption module 400B, and if stored, connection authentication is performed when the information matching this migration ID (e.g. ID for authentication and password) is input from the user.

In Step 1309, the second SVP 317 judges the compatibility of the first LU configuration in the first storage system 300A and the second LU configuration in the second storage system 300B based on the key mapping table 461 stored in the second encryption/decryption module 400B (based on the encryption target 4614 in the table 461, for example). If it is judged as incompatible, the second SVP 317 notifies the incapability of the LU configuration, between the migration source and the migration destination to the second SVP 317, to the management terminal 600 that can communicate with the second SVP 317. If it is judged as compatible, processing advances to Step 1310. In Step 1309, it is judged as compatible when the corresponding LU is defined in the second storage system (migration destination storage system) 400B for each migration target LU of the first LU configuration in the first storage system (migration source storage system) 400A, for example.

In Step 1310, the second SVP 317 loads the port-LU mapping table 1321 and LU-storage mapping table 3122 stored in the second encryption/decryption module 400B to the shared memory 312 in the second storage system 300B.

In Step 1311, the second SVP 317 changes the disk ID 31222 and address 31223 in the LU-storage mapping table 3122 loaded in the shared memory 312 based on the relationship with each LU 322 in the second storage system 300B and each storage device 321.

In Step 1312, the second SVP 317 deletes the migration ID stored in the second encryption/decryption module 400B.

The above is a description on the data migration processing. According to this data migration processing, the decryption of encrypted data and re-encryption are unnecessary. The unencrypted data need not be released outside the first storage system 300A.

In the above data migration processing, a part or all of the processing executed by the first or second SVP 317 may be performed by the first or second encryption/decryption module 400A or 400B alone, or in cooperation with the first or second SVP 317 or first or second encryption/decryption module 400A or 400B.

In the above description on the data migration processing, data in all the LUs existing in the first storage system 300A is data encrypted by the first encryption/decryption module 400A, to make description simple. However in the plurality of LUs existing in the first storage system 300A, an LU for storing data encrypted using an encryption/decryption module which is different from the first encryption/decryption module 400A may coexist. In this case, the key mapping table 461, for example, is copied for each of the encryption/decryption modules which are different from the first encryption/decryption module 400A.

In the above mentioned data migration processing, the first key 462A itself may be copied from the first encryption/decryption module 400A to the second encryption/decryption module 400B in addition to the key mapping table 461. If a first encryption/decryption program that executes the first encryption/decryption scheme is stored in the first encryption/decryption module 400A, the first encryption/decryption program may be copied from the first encryption/decryption module 400A to the second encryption/decryption module 400B.

Figure 16A:
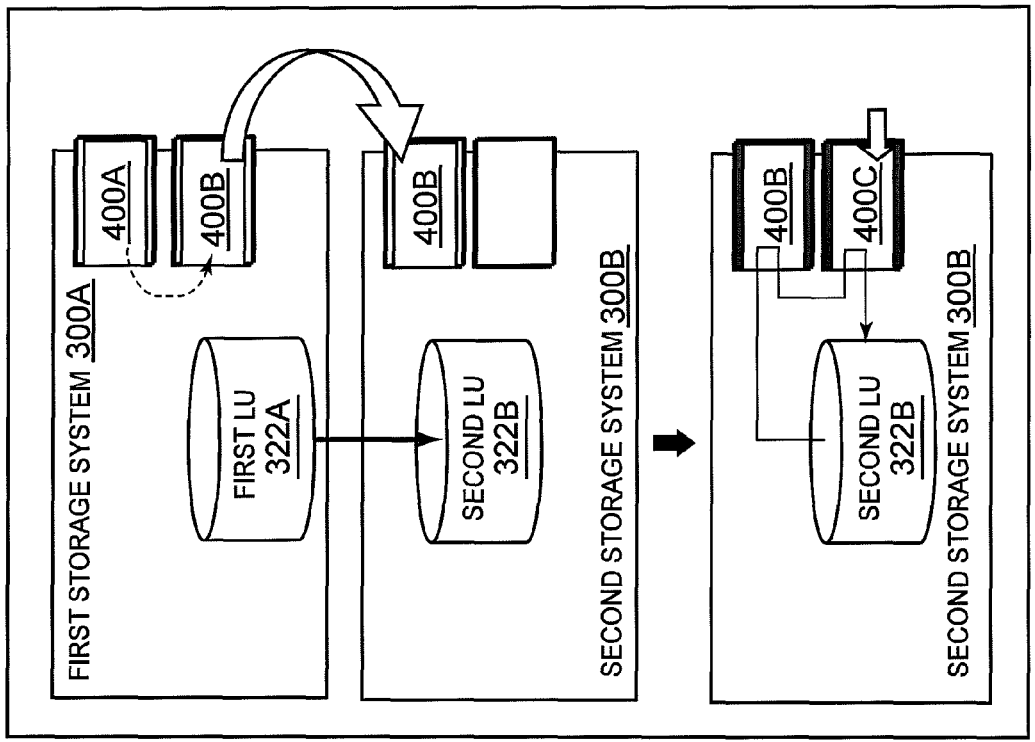
FIG. 16A is a diagram depicting a first example where both a change of encryption/decryption scheme and migration of data are executed.
Figure 16B:
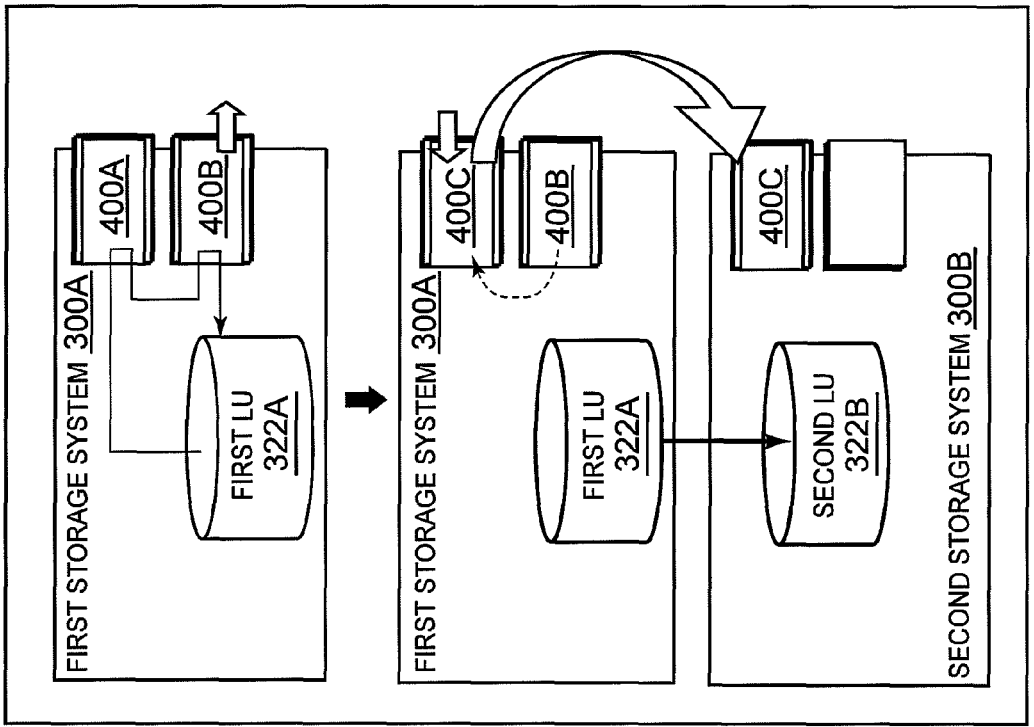
FIG. 16B is a diagram depicting a second example where both a change of encryption/decryption scheme and migration of data are executed.

The encryption/decryption scheme change processing and the data migration processing may be combined, for example. Specifically as FIG. 16A shows, after the encryption/decryption scheme change processing is executed in the first storage system 300A (after the first encryption/decryption scheme by the first encryption/decryption module 400A is changed to the second encryption/decryption scheme by the second encryption/decryption module 400B), the data migration processing may be executed (for example, the key mapping table 461 in the second encryption/decryption module 400B is copied to a third encryption/decryption module 400C, the third encryption/decryption module 400C is disconnected from the first storage system 300A, and is connected to the second storage system 300B). Or as FIG. 16B shows, after the data migration processing described with reference to FIG. 14 and FIG. 15 is executed, the encryption/decryption scheme change processing may be executed in the second storage system 300B (that is, the first encryption/decryption scheme by the second encryption/decryption module 400B may be changed to the second encryption/decryption scheme by the third encryption/decryption module 400C).

Preferred embodiments of the present invention have been described above, but these are examples to describe the present invention, and are not intended to limit the scope of the present invention only to these embodiments. The present invention can be implemented in various other modes.

For example, a removable storage device 321, not limited to the encryption/decryption module 400, may be connected to the connector 814. The removable storage device 321 may be used for various applications, such as for repair and for backup.

The processing executed by the SVP 317, may be performed by a processor in the host I/F 311 and/or the storage I/F 315, for example.

The encryption and decryption may be performed not just in the storage system 300 but in another location, such as in the host computer 100. In other words, the data which is input/output to/from the host computer may have been encrypted, and further encrypted by the encryption/decryption module 400 connected to the storage system 300.

Instead of the encryption/decryption module 400 having the encryption/decryption engine 470, an encryption/decryption program for executing encryption and decryption by a predetermined encryption/decryption scheme, for example, may be stored. In this case, the processor existing in the storage control section 310, for example, may execute the encryption/decryption program so as to execute encryption/decryption.

Figure 17:
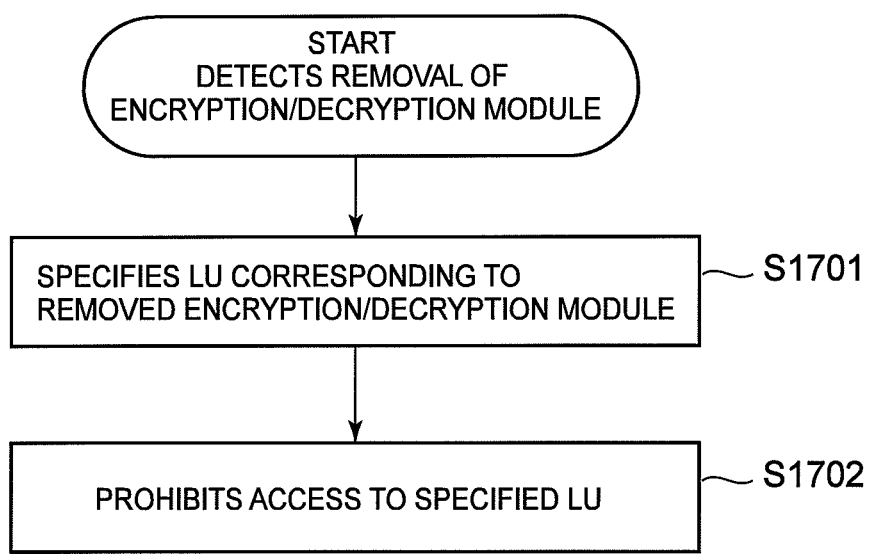
FIG. 17 is a flow chart depicting an example of access control processing.

If the SVP 317 detects the removal of the encryption/decryption module 400, for example, the SVP 317 specifies the LU 322 corresponding to the removed encryption/decryption module 400 in the tables 3121 and 3122, as shown in FIG. 17 (Step 1701), and prohibits access to the specified LU 322 (Step 1702). This is because encrypting data to be written to the LU 322 and decryption the encrypted data stored in the LU 322 are disabled. A method for prohibiting access that can be used is, for example, the SVP 317 recording the LUN of the specified LU 322 in the memory 3123 of the host I/F 311, and the host I/F 311 returning an error to the host computer 200 if a write request or read request, with specifying the LUN, is received from the host computer 200.

What is claimed is:

1. A storage system comprising:
   a storage device;
   a connector to which a removable encryption/decryption module is connected; and
   a control section which controls writing of data to the storage device and reading of data from the storage device, and has the connector, wherein
      the removable encryption/decryption module comprises a storage section for storing encryption/decryption information related to encryption and decryption of data, including key information and a key table having key management information, and for storing a port-logical unit table and a logical unit storage map table,
      at least one of the control section and the removable encryption/decryption module encrypts data using the encryption/decryption information, and the control section writes the encrypted data to the storage device, and
      the control section reads encrypted data from the storage device, and at least one of the control section and the removable encryption/decryption module decrypts the encrypted data that has been read, using the encryption/decryption information, wherein said system further includes:

a plurality of the connectors, which include a first connector and a second connector, a first removable encryption/decryption module is connected to the first connector, a second removable encryption/decryption module is connected to the second connector, the storage device stores first encrypted data by a first encryption/decryption scheme, and the control section reads the first encrypted data from the storage device, at least one of the control section and the first removable encryption/decryption module decrypts the first encrypted data that has been read, by the first encryption/decryption scheme to create decrypted data, at least one of the control section and the second removable encryption/decryption module encrypts the decrypted data to create second encrypted data, by a second encryption/decryption scheme, and the control section writes the second encrypted data to the storage device, or another storage device, and wherein first key information is included in first encryption/decryption information of the first removable encryption/decryption module, second key information is included in second encryption/decryption information of the second removable encryption/decryption module, the first encrypted data stored in the storage device is data encrypted using the first key information by the first encryption/decryption scheme, and at least one of the control section and the first removable encryption/decryption module decrypts the first encrypted data that has been read, using the first key information by the first encryption/decryption scheme, and at least one of the control section and the second removable encryption/decryption module encrypts the decrypted data to create the second encrypted data, using the second key information by the second encryption/decryption scheme, and wherein the first encryption/decryption information includes key management information, and the key management information shows correspondence of a first key ID, which is information for identifying the first key information, and encryption target element information for indicating a storage device or an element with which a storage device is associated, at least one of the control section, the first removable encryption/decryption module and the second removable encryption/decryption module copies the first key management information from the storage section of the first removable encryption/decryption module to the storage section of the second removable encryption/decryption module, at least one of the control section and the second removable encryption/decryption module updates the first key ID in the copied key management information to a second key ID which is information for identifying the second key information, and the control section judges whether the second encryption/decryption scheme, which is an encryption/decryption scheme after change of the first encryption/decryption scheme, is an older scheme than the first encryption/decryption scheme, which is the encryption/decryption scheme before change, and when judged as the older scheme, sends a warning, whereby encrypted data migrated from a first storage system to a second storage system without decryption of the encrypted data.

2. The storage system according to claim 1, wherein access to the storage device is prohibited when the control section detects that the removable encryption/decryption module is disconnected from the connector.

3. The storage system according to claim 1, wherein the connector is constructed so that a removable storage device is connectable thereto.

4. The storage system according to claim 1, wherein the removable encryption/decryption module further comprises an encryption/decryption engine for performing encryption and decryption.

5. The storage system according to claim 1, wherein a management storage section for storing encryption/decryption management information is further provided, the encryption/decryption management information shows the correspondence of a module ID, which is information for identifying an encryption/decryption module, and encryption target element information for indicating a storage device or an element with which a storage device is associated, and the control section specifies a module ID corresponding to an encryption target information element related to an access destination storage device based on the encryption/decryption management information, and an encryption/decryption module identified by the specified module ID encrypts data to be written to the access destination storage device, or decrypts encrypted data read from the access destination storage device.

6. A storage system comprising:

a storage device;

a connector to which a removable encryption/decryption module is connected; and a control section which controls writing of data to the storage device and reading of data from the storage device, and has the connector, wherein the removable encryption/decryption module comprises a storage section for storing encryption/decryption information related to encryption and decryption of data, at least one of the control section and the removable encryption/decryption module encrypts data using the encryption/decryption information, and the control section writes the encrypted data to the storage device, and the control section reads encrypted data from the storage device, and at least one of the control section and the removable encryption/decryption module decrypts the encrypted data that has been read, using the encryption/decryption information, wherein said system further includes:

a plurality of the connectors exist, which include a first connector and a second connector, a first removable encryption/decryption module is connected to the first connector, a second removable encryption/decryption module is connected to the second connector, the storage device stores first encrypted data by a first encryption/decryption scheme, and the control section reads the first encrypted data from the storage device, at least one of the control section and the first removable encryption/decryption module decrypts the first encrypted data that has been read, by the first encryption/decryption scheme to create decrypted data, at least one of the control section and the second removable encryption/decryption module encrypts the decrypted data to create second encrypted data, by a second encryption/decryption scheme, and the control section writes the second encrypted data to the storage device, or another storage device, and wherein
first key information is included in first encryption/decryption information of the first removable encryption/decryption module,
second key information is included in second encryption/decryption information of the second removable encryption/decryption module,
the first encrypted data stored in the storage device is data encrypted using the first key information by the first encryption/decryption scheme, and
at least one of the control section and the first removable encryption/decryption module decrypts the first encrypted data that has been read, using the first key information by the first encryption/decryption scheme, and at least one of the control section and the second removable encryption/decryption module encrypts the decrypted data to create the second encrypted data, using the second key information by the second encryption/decryption scheme, and wherein
the first encryption/decryption information includes key management information, and the key management information shows correspondence of a first key ID, which is information for identifying the first key information, and encryption target element information for indicating a storage device or an element with which a storage device is associated,
at least one of the control section, the first removable encryption/decryption module and the removable second encryption/decryption module copies the first key management information from the storage section of the first removable encryption/decryption module to the storage section of the second removable encryption/decryption module, and
at least one of the control section and the second removable encryption/decryption module updates the first key ID in the copied key management information to a second key ID which is information for identifying the second key information, and
wherein at least one of the control section, the first removable encryption/decryption module and the second removable encryption/decryption module judges compatibility between the first encryption/decryption scheme and the second encryption/decryption scheme based on a feature of the encrypted data prior to decryption, and at least one of the control section and the first encryption/decryption module performs decryption by the first encryption/decryption scheme when judged as compatible and precludes decryption when judged as incompatible.

7. The storage system according to claim 6, wherein compatibility refers to whether the data size of encrypted data is different between a case of encrypting data with a predetermined data size by the first encryption/decryption scheme, and a case of encrypting the data by the second encryption/decryption scheme.

8. A storage system comprising:
a storage device;
a connector to which a removable encryption/decryption module is connected; and
a control section which controls writing of data to the storage device and reading of data from the storage device, and has the connector, wherein
the removable encryption/decryption module comprises a storage section for storing encryption/decryption information related to encryption and decryption of data,
at least one of the control section and the removable encryption/decryption module encrypts data using the encryption/decryption information, and the control section writes the encrypted data to the storage device, and
the control section reads encrypted data from the storage device, and at least one of the control section and the removable encryption/decryption module decrypts the encrypted data that has been read, using the encryption/decryption information, wherein said system further includes:
a plurality of the connectors exist, which include a first connector and a second connector,
a first removable encryption/decryption module is connected to the first connector,
a second removable encryption/decryption module is connected to the second connector,
the storage device stores first encrypted data by a first encryption/decryption scheme, and
the control section reads the first encrypted data from the storage device, at least one of the control section and the first removable encryption/decryption module decrypts the first encrypted data that has been read, by the first encryption/decryption scheme to create decrypted data, at least one of the control section and the second removable encryption/decryption module encrypts the decrypted data to create second encrypted data, by a second encryption/decryption scheme, and the control section writes the second encrypted data to the storage device, or another storage device, and wherein
first key information is included in first encryption/decryption information of the first removable encryption/decryption module,
second key information is included in second encryption/decryption information of the second removable encryption/decryption module,
the first encrypted data stored in the storage device is data encrypted using the first key information by the first encryption/decryption scheme, and
at least one of the control section and the first removable encryption/decryption module decrypts the first encrypted data that has been read, using the first key information by the first encryption/decryption scheme, and at least one of the control section and the second removable encryption/decryption module encrypts the decrypted data to create the second encrypted data, using the second key information by the second encryption/decryption scheme, and wherein
the first encryption/decryption information includes key management information, and the key management information shows correspondence of a first key ID, which is information for identifying the first key information, and encryption target element information for indicating a storage device or an element with which a storage device is associated, at least one of the control section, the first removable encryption/decryption module and the second removable encryption/decryption module copies the first key management information from the storage section of the first removable encryption/decryption module to the storage section of the second removable encryption/decryption module, at least one of the control section and the second removable encryption/decryption module updates the first key ID in the copied key management information to a second key ID which is information for identifying the second key information, at least one of the control section, the first removable encryption/decryption module and the second removable encryption/decryption module copies all or a part of the encryption/decryption information from the first removable encryption/decryption module to the second removable encryption/decryption module, and the control section reads the encrypted data from the storage device, and sends the encrypted data to a migration destination storage system without decryption of the data.

9. The storage system according to claim 8, wherein the part of the encryption/decryption information to be copied refers to the key management information.

10. The storage system according to claim 8, wherein the removable encryption/decryption module further comprises an authentication information storage section for storing authentication information, at least one of the control section and the removable encryption/decryption module judges whether the use of the removable encryption/decryption module is permitted using the authentication information, the first removable encryption/decryption module is a module for which use in the storage system is judged to be permitted in the judgment of usage permission, and the second removable encryption/decryption module is a module for which use in the storage system is judged to be temporarily permitted for copying the encryption/decryption information in the judgment of usage permission.

* * * * *